United States Patent
Rieber et al.

(10) Patent No.: US 11,020,681 B2
(45) Date of Patent: Jun. 1, 2021

(54) SUPER FOLD PLAYHOUSE

(71) Applicant: KidKraft, Inc., Dallas, TX (US)

(72) Inventors: Frederick Rieber, Hamburg, NY (US); David Barr, Dallas, TX (US)

(73) Assignee: KIDKRAFT, INC., Dallas, TX (US)

( * ) Notice: Subject to any disclaimer, the term of this patent is extended or adjusted under 35 U.S.C. 154(b) by 0 days.

(21) Appl. No.: 16/631,364

(22) PCT Filed: Jul. 20, 2018

(86) PCT No.: PCT/US2018/043113
§ 371 (c)(1),
(2) Date: Jan. 15, 2020

(87) PCT Pub. No.: WO2019/018779
PCT Pub. Date: Jan. 24, 2019

(65) Prior Publication Data
US 2020/0215448 A1 Jul. 9, 2020

Related U.S. Application Data

(60) Provisional application No. 62/535,096, filed on Jul. 20, 2017.

(51) Int. Cl.
*A63H 33/00* (2006.01)
*E04B 1/344* (2006.01)
*F16C 11/04* (2006.01)

(52) U.S. Cl.
CPC ......... *A63H 33/008* (2013.01); *E04B 1/3447* (2013.01); *F16C 11/04* (2013.01)

(58) Field of Classification Search
CPC . A63H 3/00; A63H 3/52; A63H 33/00; A63H 33/08; A63H 33/0445; A63H 33/16;
(Continued)

(56) References Cited

U.S. PATENT DOCUMENTS 3,231,942 A     2/1966  O'Brien
3,516,389 A  *  6/1970  Meyer .................... A01K 15/02
                                                119/417
(Continued)

FOREIGN PATENT DOCUMENTS

DE     19918248       10/2000
WO     2016174556 A1  11/2016
WO     2019018779 A1  1/2019

OTHER PUBLICATIONS

Foreign communication from a related counterpart application—International Search Report and Written Opinion, PCT/US2018/043113 dated Oct. 23, 2018, 14 pages.

(Continued)

*Primary Examiner* — Kien T Nguyen
(74) *Attorney, Agent, or Firm* — Jackson Walker LLP

(57) ABSTRACT

Embodiments relate generally to a foldable play structure comprising a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a play structure. A method for assembling a foldable structure may comprise providing a playhouse with an accordion fold structure, wherein in a first configuration of the accordion fold structure, the plurality of panels are folded to be stacked in substantially parallel planes, and in a second configuration of the accordion fold structure, the plurality of panels are unfolded forming a play structure; and unfolding the playhouse from the first configuration to the second configuration.

17 Claims, 24 Drawing Sheets

(58) Field of Classification Search
CPC ......... E04H 1/00; E04H 1/1205; E04H 15/00; E04H 15/48; E04H 9/10; A01K 15/00; A01K 15/02; A47B 81/00
USPC ........ 448/476, 478, 487–488; 160/130, 135; 256/25–26
See application file for complete search history.

(56) References Cited

U.S. PATENT DOCUMENTS

| | | | |
|---|---|---|---|
| 4,467,572 A | 8/1984 | Somers et al. | |
| 4,823,858 A | 4/1989 | Perutz | |
| 4,964,249 A | 10/1990 | Payne | |
| 5,096,204 A * | 3/1992 | Lippman | A63H 33/38 273/285 |
| 5,265,848 A * | 11/1993 | Michaud | E04H 17/18 256/24 |
| 5,423,709 A * | 6/1995 | Summers | A63H 3/52 446/108 |
| 5,544,870 A * | 8/1996 | Kelley | A47D 13/065 256/25 |
| 5,950,568 A | 9/1999 | Axelrod et al. | |
| 6,904,719 B2 * | 6/2005 | Braun | A47B 81/00 256/1 |
| 7,581,357 B2 * | 9/2009 | Richardson | E04B 1/34321 446/105 |
| 8,407,946 B1 * | 4/2013 | Aaron | E04H 1/1266 312/258 |
| 8,578,661 B1 | 11/2013 | Braley | |
| 2002/0098774 A1 * | 7/2002 | Huang | G09B 19/02 446/487 |

OTHER PUBLICATIONS

Foreign communication from a related counterpart application—International Preliminary Report on Patentability, PCT/US2018/043113 dated Jan. 30, 2020, 13 pages.

Filing Receipt and Specification for patent application entitled "Compact multiple gable house design and assembly," by Frederick Rieber, filed Apr. 4, 2017 as U.S. Appl. No. 62/481,420.

Ecxtended European Search Report dated Mar. 18, 2021 from the European Patent Office for co-pending European Patent Application No. EP18834549.0, 11 pages.

* cited by examiner

SUPER FOLD PLAYHOUSE

CROSS-REFERENCE TO RELATED APPLICATIONS

This application is a filing under 35 U.S.C. 371 of International Application No. PCT/US2018/043113 filed Jul. 20, 2018, entitled "Super Fold Playhouse," claiming priority of U.S. Provisional Patent Application Ser. No. 62/535,096 filed Jul. 20, 2017 by Frederick Rieber, et al. and entitled "Super Fold Playhouse" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Typical children's play structures (including play houses, play tables, and/or play stations) may be sold to consumers at least partially disassembled and contained within a box or packaging. The play structures may then be assembled by the user, using the parts and instructions associated with the play structure.

SUMMARY

In an embodiment, a foldable playhouse may comprise a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a playhouse.

In an embodiment, a foldable play structure may comprise a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a play structure.

In an embodiment, a method for assembling a foldable playhouse may comprise providing a playhouse with an accordion fold structure comprising a plurality of panels each connected to another by at least one hinge, wherein in a first configuration of the accordion fold structure, the plurality of panels are folded to be stacked in substantially parallel planes, and in a second configuration of the accordion fold structure, the plurality of panels are unfolded forming a playhouse, wherein the provided playhouse is in the first configuration; orienting the playhouse so that a bottom edge of each panel is located on the ground; and unfolding the playhouse from the first configuration to the second configuration.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

Figure 1:
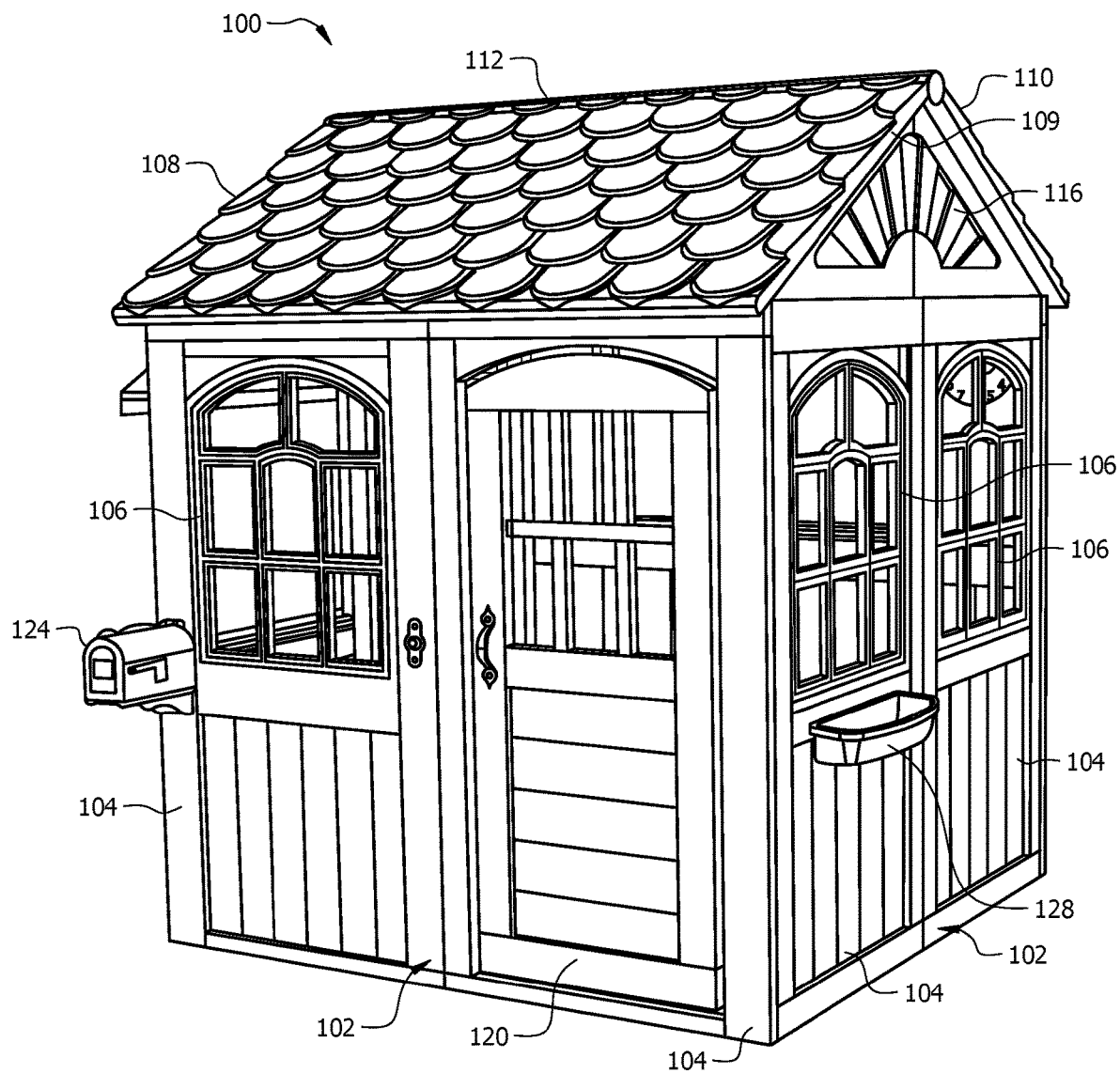
FIG. 1 illustrates a front view of a foldable playhouse, according to an embodiment of the disclosure.

In the various figures, the same reference numbers are provided for the same elements, whereas in other instances similar elements shown in different figures may have different reference numbers. The figures and associated description provide a plurality of different embodiments and similar elements among the figures illustrate to one of ordinary skill in the art the possible functionality and connection of those elements in the multiple and collective embodiments disclosed herein.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number (for example, ±10%), as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the present disclosure relate to structures which may be used as playhouses, play-stations, and/or play tables that are designed to be foldable, and therefore may be easily and compactly packaged and stored, and/or easily set up by an end user and fully assembly with relative speed and ease.

The present disclosure relates to foldable buildings, structures, play-stations and/or play table, which, when fully folded, occupy less space as it may be needed for storage and/or shipping and handling. Traditionally, many of the structures which provide a "playhouse" or other play structure environment for children are bulky with respect to the space needed for storage and/or shipping and handing, and/or the structures can comprise many small pieces which require substantial time to assemble. Where a structure may require less space or fewer pieces to assemble, the result is often a sacrifice of the decorative touches that both functionally and aesthetically enhance the playtime experience. The disclosed structure embodiments have an accordion fold feature to the walls, which decreases the space needed during storage, shipping, and stocking at retail stores. Additionally, embodiments may comprises a foldable, expandable top surface or structure (e.g., a self-expanding gable roof, a foldable or split top play surface, etc.) which provides both functional and aesthetic value to the structure without adding assembly time.

Disclosed are descriptions of exemplary foldable structure embodiments which may be used as playhouses, play-stations, and/or play tables. The described structures are foldable and may therefore be compactly packaged and easily assembled, as illustrated in the disclosed embodiments. The described structures provide for both walls that are foldable onto themselves and collectively together, and self-expanding top surface(s) (e.g. gables for the roof structure, and/or a top play surface), which additionally aid in easy assembly. The described systems provide for compactly packaged structures, which are optimized for shipping and handling.

Provided in the present disclosure are interconnected wall panels that are foldable. All (or at least some) of the wall panels of the structure are connected to each other through hinges (e.g., with each wall panel attached to at least one other wall panel via one or more hinges). Typically, each wall would comprise two or more panels, although in some embodiments, one or more wall might be a single unified panel, while at least one wall (and typically at least two walls) would be formed of multiple panels.

In one embodiment, at least one (and up to three) of the disclosed walls have hinges at their centers (e.g., each formed of two panels), with a fourth wall being split in two with its two pieces/panels being at either end of a super folded stack (e.g., the fourth wall configured to be formed of two end panels oriented end-to-end to jointly form the fourth wall). The walls may fold down into a compact package that is optimized for storage and for shipping and handling. Additionally, provided in the present disclosure is an expandable roof with self-expanding gables, coupled in such a way that the roof and the gables will expand together (e.g., without the need for tools and/or additional elements to be attached) and the now-expanded assembly fits on top of the now-unfolded foldable structure.

In another embodiment, two (opposing) walls may have hinges at their centers (e.g., each formed of two panels), while the other two (opposing) walls may comprise a single panel, wherein the hinged walls may fold to allow the other two walls to fold/collapse toward one another (e.g., in a substantially flat folded configuration). The walls may fold down into a compact package that is optimized for storage and for shipping and handling. Additionally, the structure may comprise a foldable, expandable top play surface, configured to unfold and fit on top of the now-unfolded play structure.

Referring now to the figures, FIG. 1 illustrates a front view of one embodiment of a foldable structure, which may comprise a foldable playhouse 100. The disclosed playhouse 100 comprises foldable walls 102 made up of one or more panels 104 (for example, four walls in this exemplary embodiment). As illustrated in FIG. 1, a specific embodiment of the playhouse 100 may comprise four walls 102, however other embodiments may comprise three walls 102, or five walls 102, or greater than five walls 102. At least some of the foldable walls 102 of the playhouse 100 are interconnected, which thereby provides for more efficient packaging and assembly. The walls 102 may comprise one or more panels 104 (for example connected by hinges to allow folding/unfolding of the walls 102 and the panels may comprise fixed or moveable elements which may be similar in appearance and/or function to a door 120 or window, or other moveable or fixed object. In a specific embodiment, a panel 104 comprises a door 120.

The disclosed playhouse 100 may additionally comprise a roof 108. In some embodiments, the roof 108 may comprise individual panels 109 and 110, which may be connected through a single hinge or multiple hinges 112. The number of hinges 112 may be one, or two, or three, or four, or more than four. As illustrated in FIG. 1, a specific embodiment of the playhouse 100 comprises a roof 108 that comprises two panels 109 and 110, which are connected through hinges 112. In other embodiments, the number of panels comprising the roof 108 may be one, or three, or four, or greater than four.

Further, the disclosed playhouse 100 may comprise one or more gables 116. As illustrated in FIG. 1, a specific embodiment of a playhouse 100 may comprise two gables 116, and they may be located on opposing sides of the playhouse 100 (e.g., opposite sides of the roof 108). Other embodiments are contemplated wherein the number of gables 116 may be one, or three, or four, or more than four.

Figure 2:
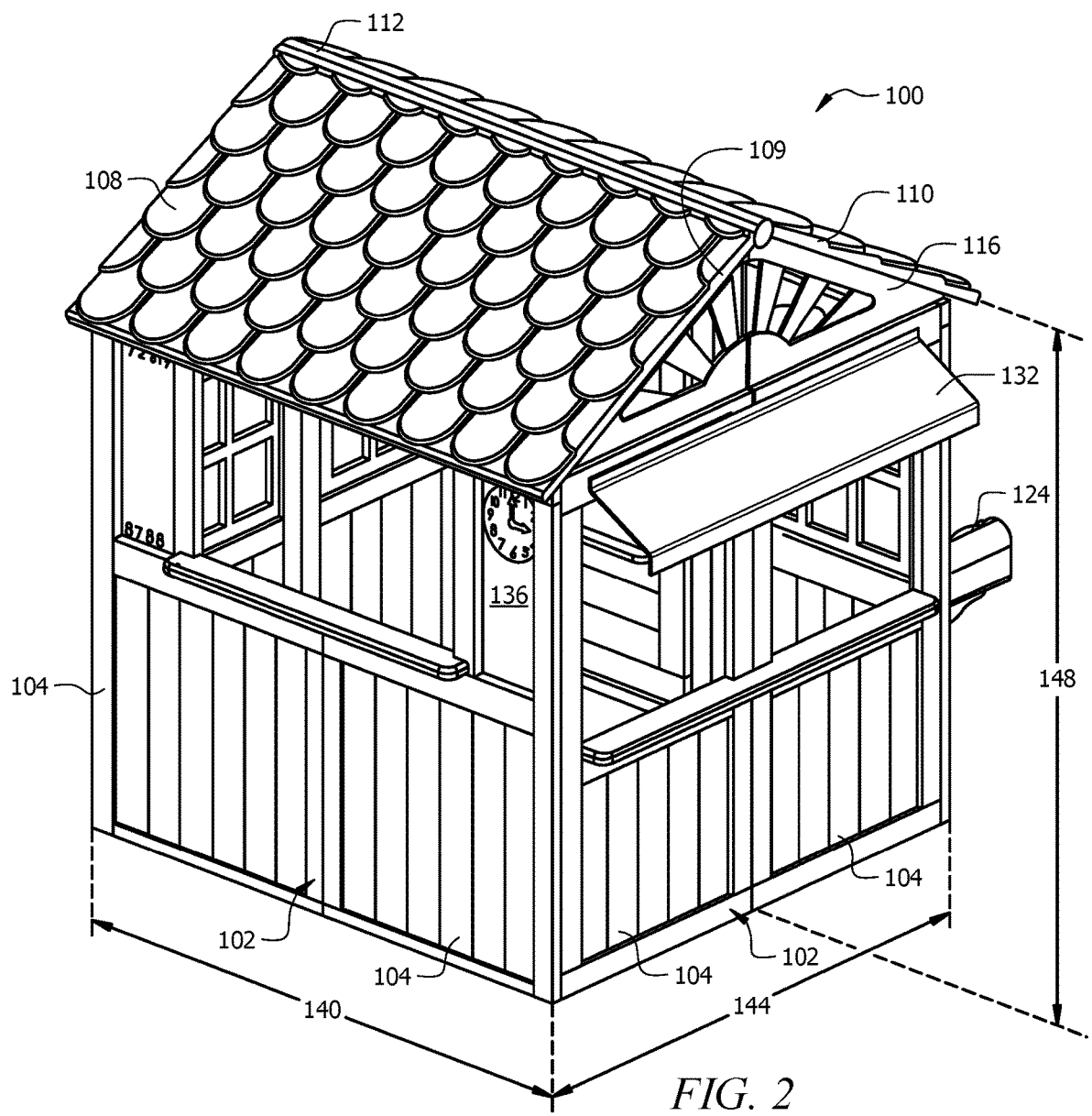
FIG. 2 illustrates from another angle a fully assembled foldable playhouse, according to an embodiment of the disclosure.

The disclosed playhouse 100 may also comprise accessories, which may be either functional or decorative, or both functional and decorative. In a specific embodiment, illustrated in FIG. 1, a playhouse 100 may comprise a mailbox 124 and/or a flower basket 128. As seen in FIGS. 1 and 2, additional accessories may include, without being limited to, alone or in any combination, a canopy 132, a wall clock 136, or other accessory. In embodiments which include a canopy 132, the canopy 132 may comprise vinyl or similar material. The canopy 132 may be mounted with a support line or similar structure, and the support line may be comprised of steel or similar material. As will be further discussed below, the canopy can further provide lateral structural support to the foldable panel 104 to keep it from folding once the playhouse 100 has been assembled and the foldable panels 104 have been unfolded so as to provide straight, opposing walls. Accessories may be fashioned from the same material as the playhouse 100 and may, in some embodiments, be an integral feature of an element (i.e., wall clock 136, roof 108, etc.), e.g., fashioned as a single unit. Alternatively and/or additionally, accessories may be either permanently affixed to the playhouse or may be detachable. The accessories described herein are meant to be exemplary; other accessories, or no accessories, may be used. In certain described embodiments, the accessories may provide additional structural support in an assembled playhouse 100.

Referring now to FIG. 2, the assembled foldable playhouse 100 may comprise specific dimensions or ratios of dimensions. In the embodiment illustrated in FIG. 2, a length 140, a width 144, and a height 148 for the overall dimensions are indicated. The values assigned to length 140, width 144, and height 148 in FIG. 2 are just one possible example of a set of measurements and should not be construed to be limiting. In some embodiments, a playhouse 100 may have a length 140 of about 1.06 meter (m), or about 1.10 m, or about 1.14 m, or about 1.18 m, or about 1.20 m, or about 1.22 m, or about 1.26 m, or about 1.30 m, where "about" represents plus or minus 0.02 m. A playhouse 100 may have a width 144 of about 1.01 m, or about 1.05 m, or about 1.09 m, or about 1.13 m, or about 1.15 m, or about 1.17 m, or about 1.21 m, or about 1.25 m, where "about" represents plus or minus 0.02 m. A playhouse 100 may have a height of about 1.33 m, or about 1.37 m, or about 1.41 m, or about 1.45 m, or about 1.49 m, or about 1.53 m, or about 1.57 m, where "about" represents plus or minus 0.02 m.

As will be further described below, because the panels 104 are foldable, the disclosed designs allow for the playhouse to be compactly packaged and easily assembled. The specific embodiment of a foldable playhouse 100 illustrated in FIG. 2 may additionally comprise panels 104, a roof 108, roof hinges 112, gable 116, mailbox 124, flower basket 128, canopy 132, and a wall clock 136.

Figure 3:
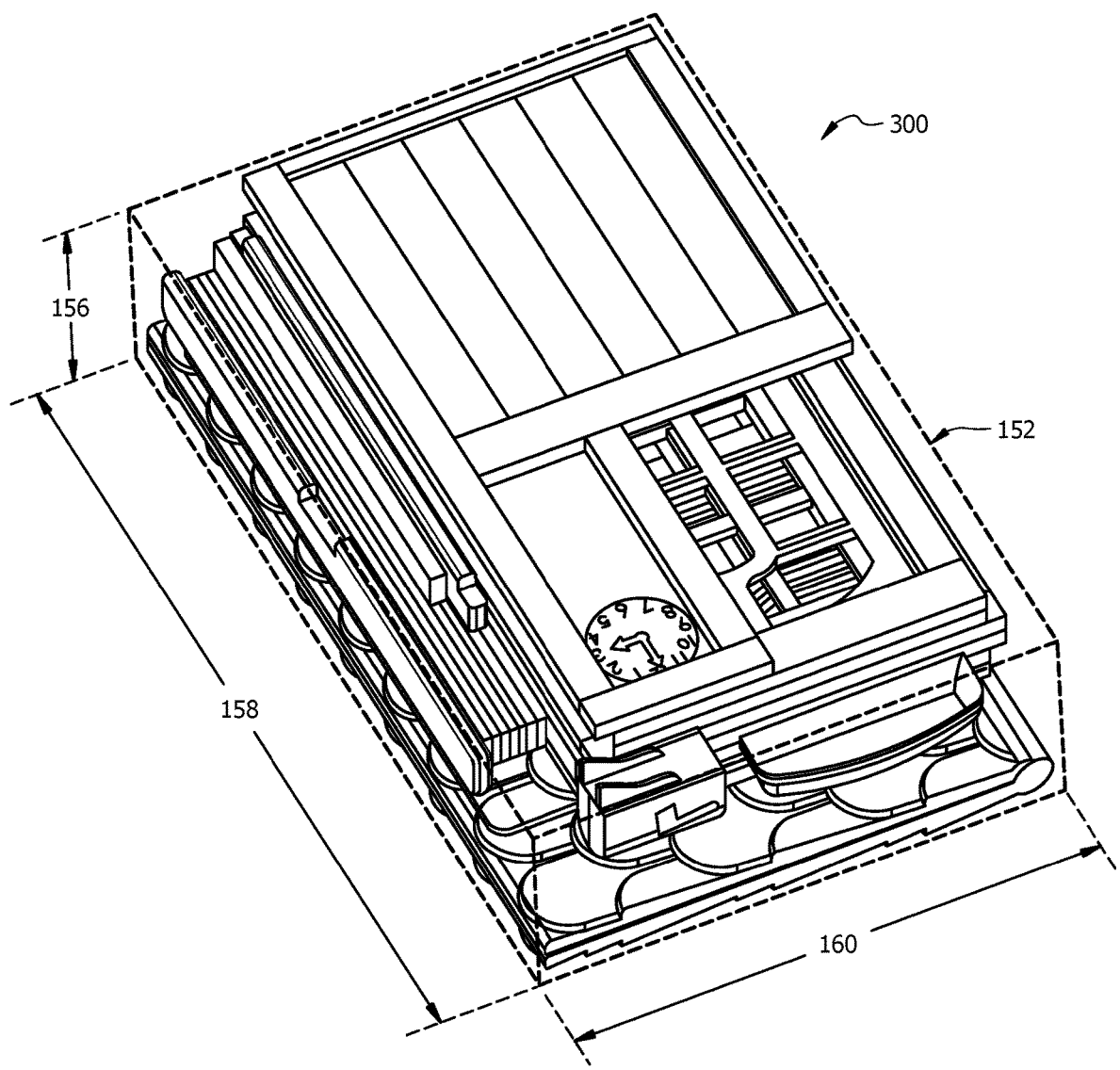
FIG. 3 illustrates a packaging scheme for a foldable playhouse in folded configuration, according to an embodiment of the disclosure.

FIG. 3 illustrates a packaged foldable playhouse 300. In some embodiments, a playhouse 300 may be packaged in any manner and/or style of packaging that is readily known to one who is skilled in the art. In a specific embodiment, illustrated in FIG. 3, a playhouse 300 may be packaged in a box 152 (shown as transparent to illustrate interaction with components of playhouse located therein). Packaging may include all or some of the elements of the playhouse 300. In a specific embodiment, the box 152 may contain every element of playhouse 300. The box 152 may have a box height 156, a box length 158, and a box width 160. The values assigned to box height 156, box length 158, and box width 160 in FIG. 3 are just one possible example of a set of measurements and should not be construed to be limiting. In some embodiments, the box 152 may have a box length 158 of between about 0.5 m and 3 m. In some embodiments, the box 152 may have a box width 160 of between about 0.5 m and 1.5 m. In some embodiments, the box 152 may have a box height 156 of between about 0.5 m and 1.5 m. In some embodiments, a box width 160 of 0.762 m (i.e., 30 inches) may be chosen to comply with global shipping dimensions. A box length 158 of 1.2246 m (i.e., 49 inches) may be chosen in order for box 152 to fit on a standard gondola of a supermarket or other retail store, e.g., Walmart and the like. The foldable playhouse 300 folds neatly into a merchandisable box 152.

FIGS. 4A-4D illustrate an accordion fold structure 400 of panels 104 according to a specific embodiment. In some embodiments, folding elements, e.g., panels, may be connected by hinges 168. The number of hinges 168 may vary between different embodiments, and may be one, or two, or three, or four, or more than four hinges 168 between two panels. Additionally, type of hinge may vary between different embodiments. A hinge 168 may be a flush hinge, a knuckle hinge, a butt hinge, a T-hinge, a strap hinge, a gate hinge, a double-acting hinge, a Soss hinge, a continuous hinge, a lift-joint butt hinge, an ornamental hinge, or any other type and/or style of hinge as would be readily known to one who is skilled in the art. In a specific embodiment, illustrated in FIGS. 4A-4D, a hinge 168 may be a living hinge. In other embodiments, a hinge 168 may be a living hinge consisting of plastic. One advantage of using multiple folding elements (e.g., panels 104) connected through hinges 168 is that the storage and/or packaging space panels 104 require is considerably reduced (e.g., since walls may be collapsed into several smaller panels). In a specific example, as illustrated in FIGS. 4A-4D, using eight folding elements instead of four may cut the storage and/or packaging space required by panels 104 in half.

Figure 4A:
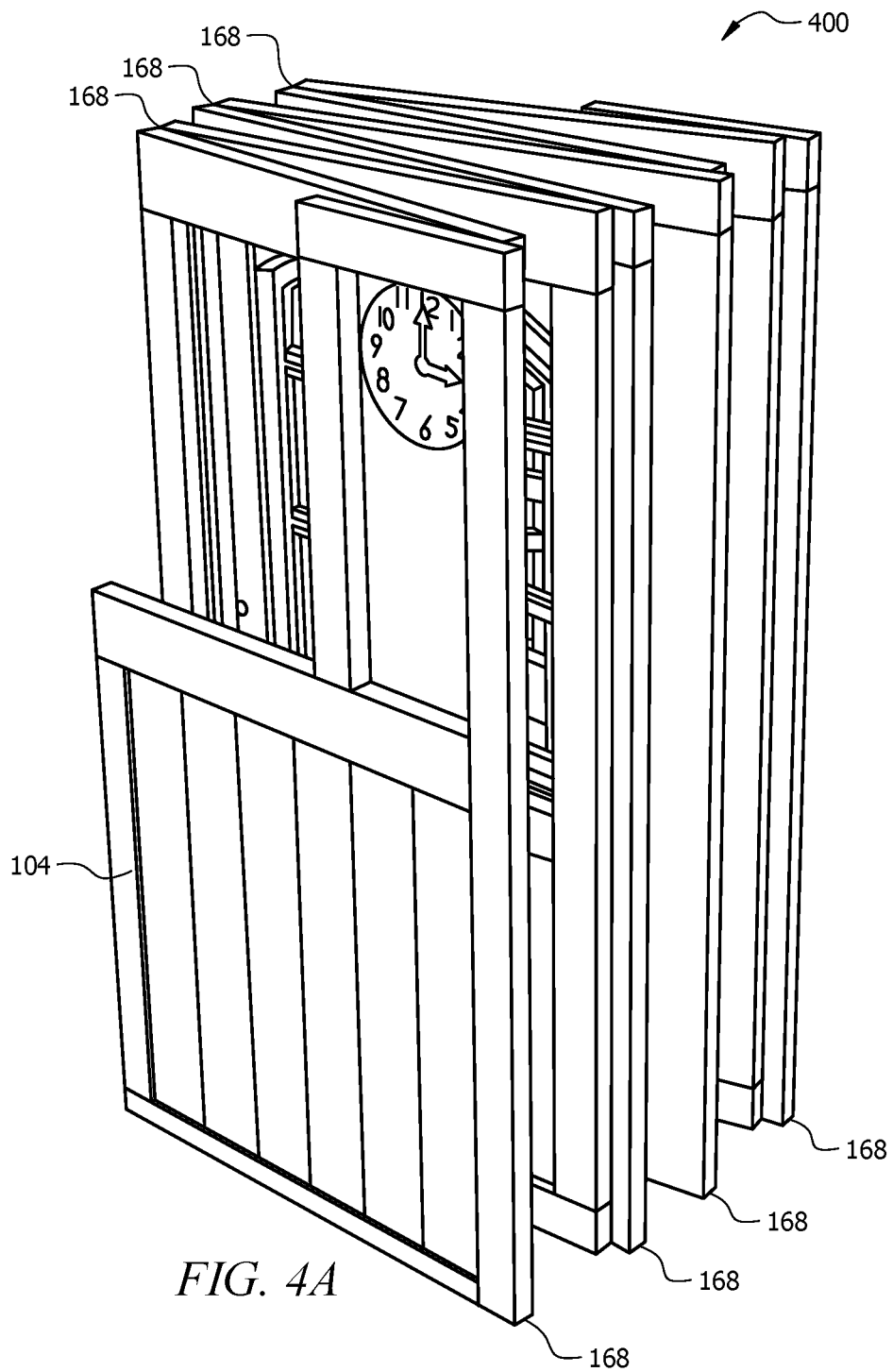
FIG. 4A illustrates a foldable playhouse about 80% folded, according to an embodiment of the disclosure.
Figure 4B:
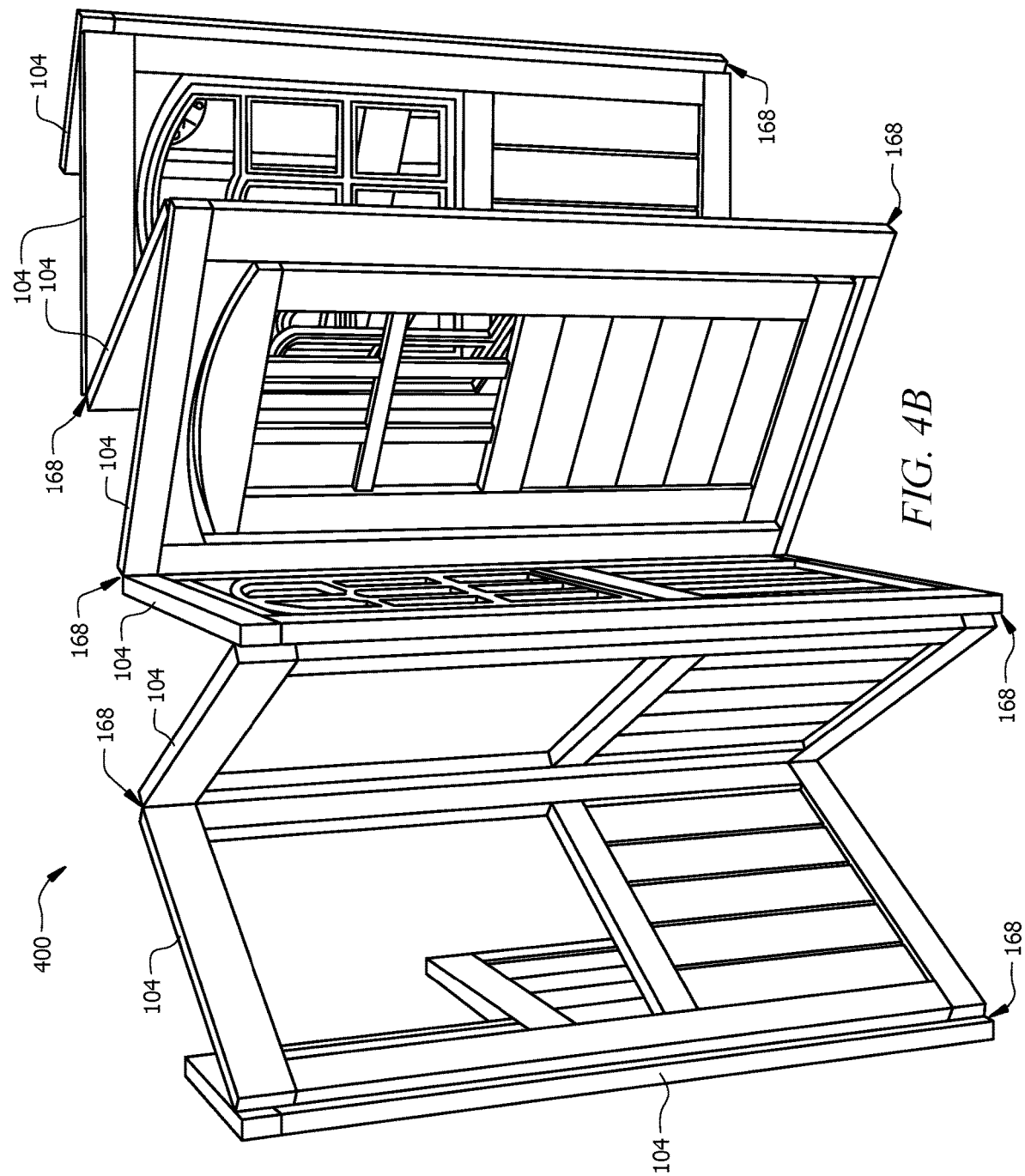
FIG. 4B illustrates a foldable playhouse about 60% folded, according to an embodiment of the disclosure.
Figure 4C:
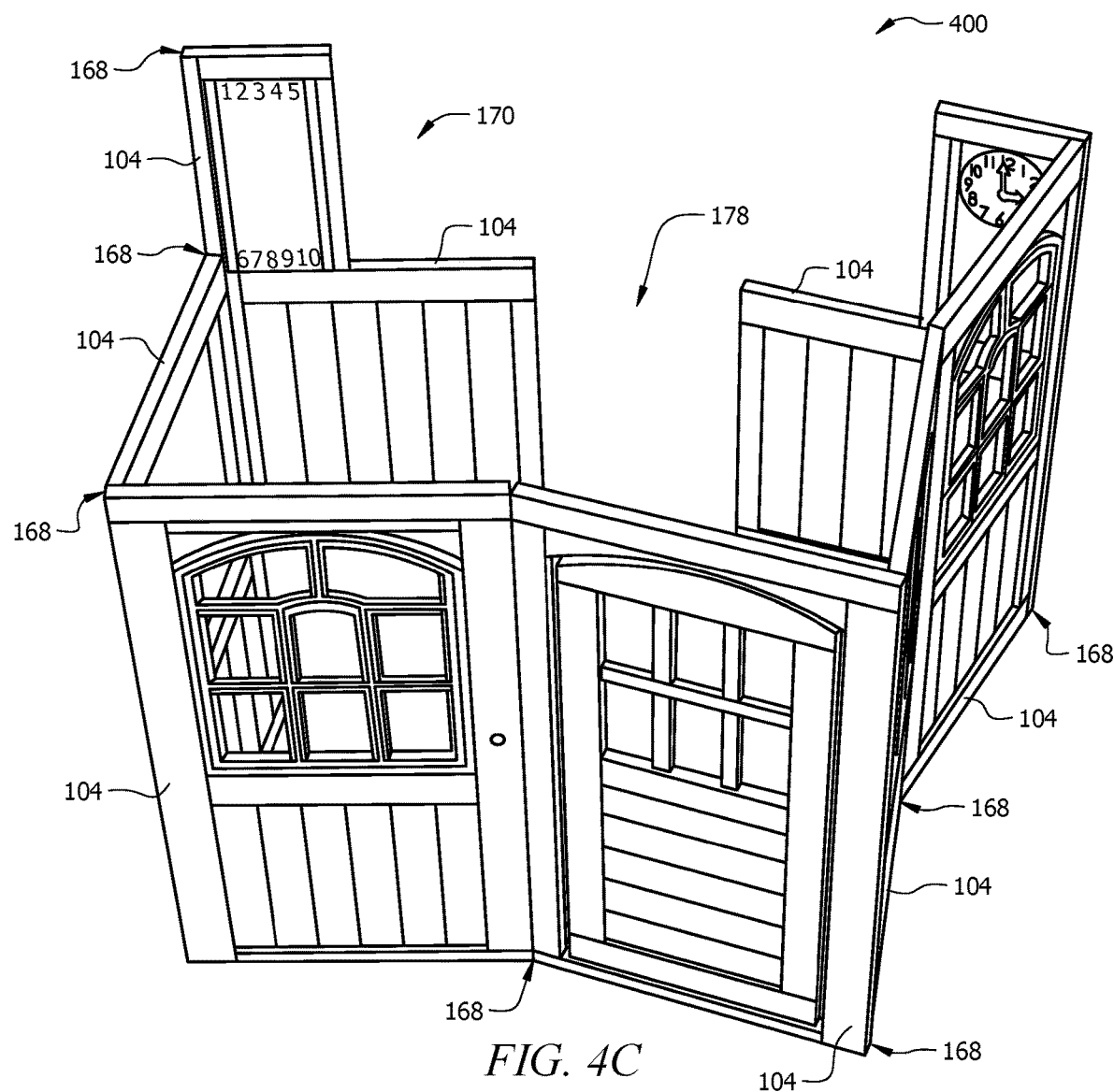
FIG. 4C illustrates a foldable playhouse with an accordion fold feature about 20% folded, according to an embodiment of the disclosure.

FIGS. 4A-4C illustrate the accordion fold structure 400 at various stages of folding of panels 104. A specific embodiment is shown at 80%, at 60%, and at 20% of a fully folded configuration in FIGS. 4A, 4B, and 4C, respectively. The specific embodiment illustrated in the above referenced figures comprises elements (e.g., panels 104) connected through hinges 168.

In some embodiments, and as illustrated in FIG. 4C, folding elements (e.g., panels 104) at either open end of an accordion fold structure 400 arrangement may connect when playhouse 100 is assembled (e.g., panels abut end-to-end or edge-to-edge to form the fourth wall). In a specific embodiment, illustrated in FIGS. 4C and 4D, the panels 104 may connect and close across the back side of the playhouse 100 at an opening gap 178 (which may be at or near a cafe opening 170 in this embodiment). In other embodiments, either open end of an accordion fold structure 400 arrangement may connect and close across the front end, and/or any of the sides of the of the assembled playhouse 100. The accordion fold structure 400 allows for ease of setup.

Figure 5:
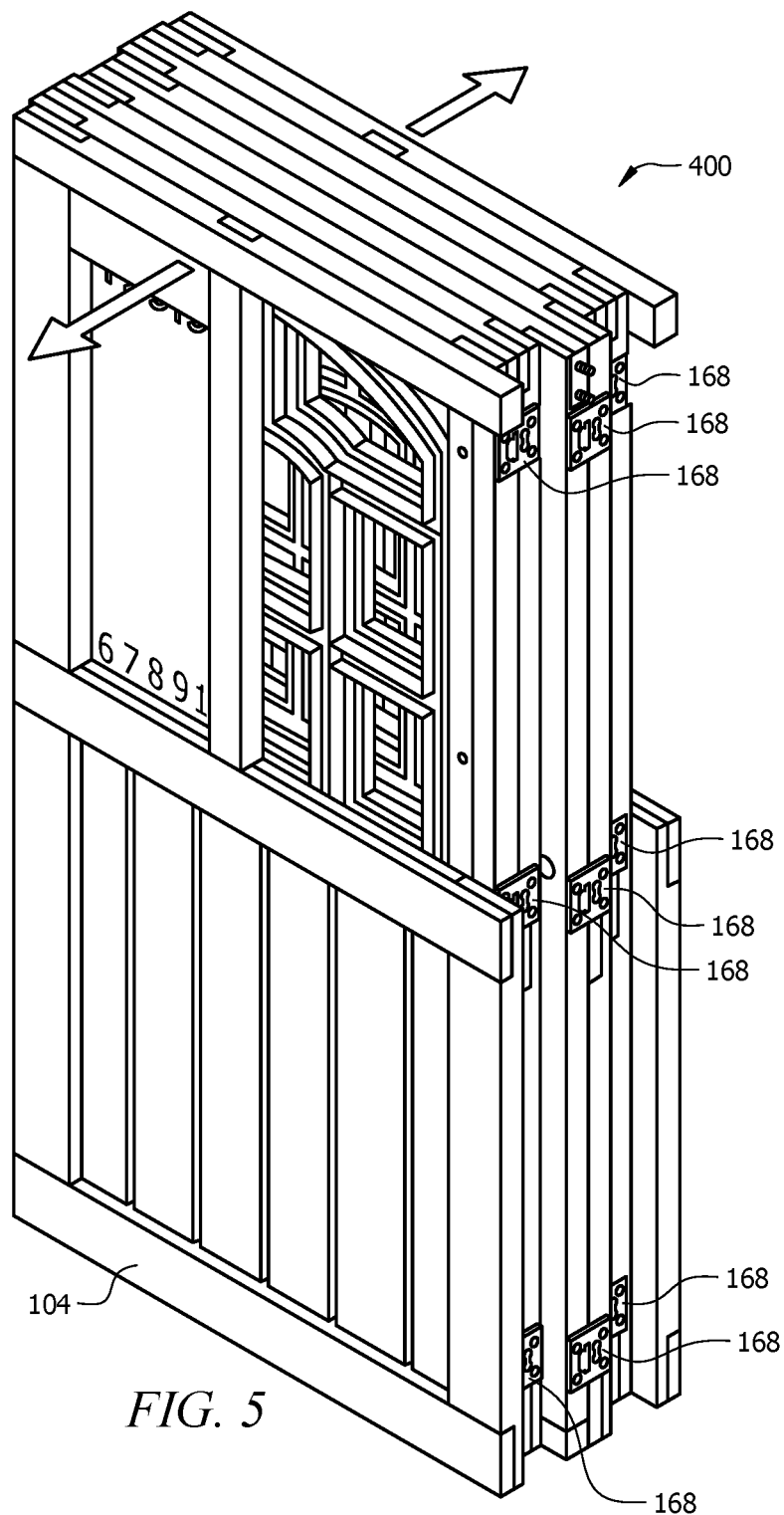
FIG. 5 illustrates a foldable playhouse in folded position, according to an embodiment of the disclosure.

FIG. 5 illustrates a folded accordion fold structure 400 (e.g., formed of a plurality of panels pivotally connected by hinges, with each panel connected to at least one other panel), where the hinges 168 comprise a plurality of living hinges attached to the panels 104. In the embodiment of FIG. 5, the hinges 168 may comprise three hinges spaced along the connection between the panels 104, optionally with one hinge located within the top half of the panel, one hinge located close to the middle of the panel, and one hinge located within a bottom half of the panel. FIG. 5 illustrates just one example of hinge placement, where any number of hinges may be used, where the hinge may cover a variety of lengths along the panels.

Figure 6:
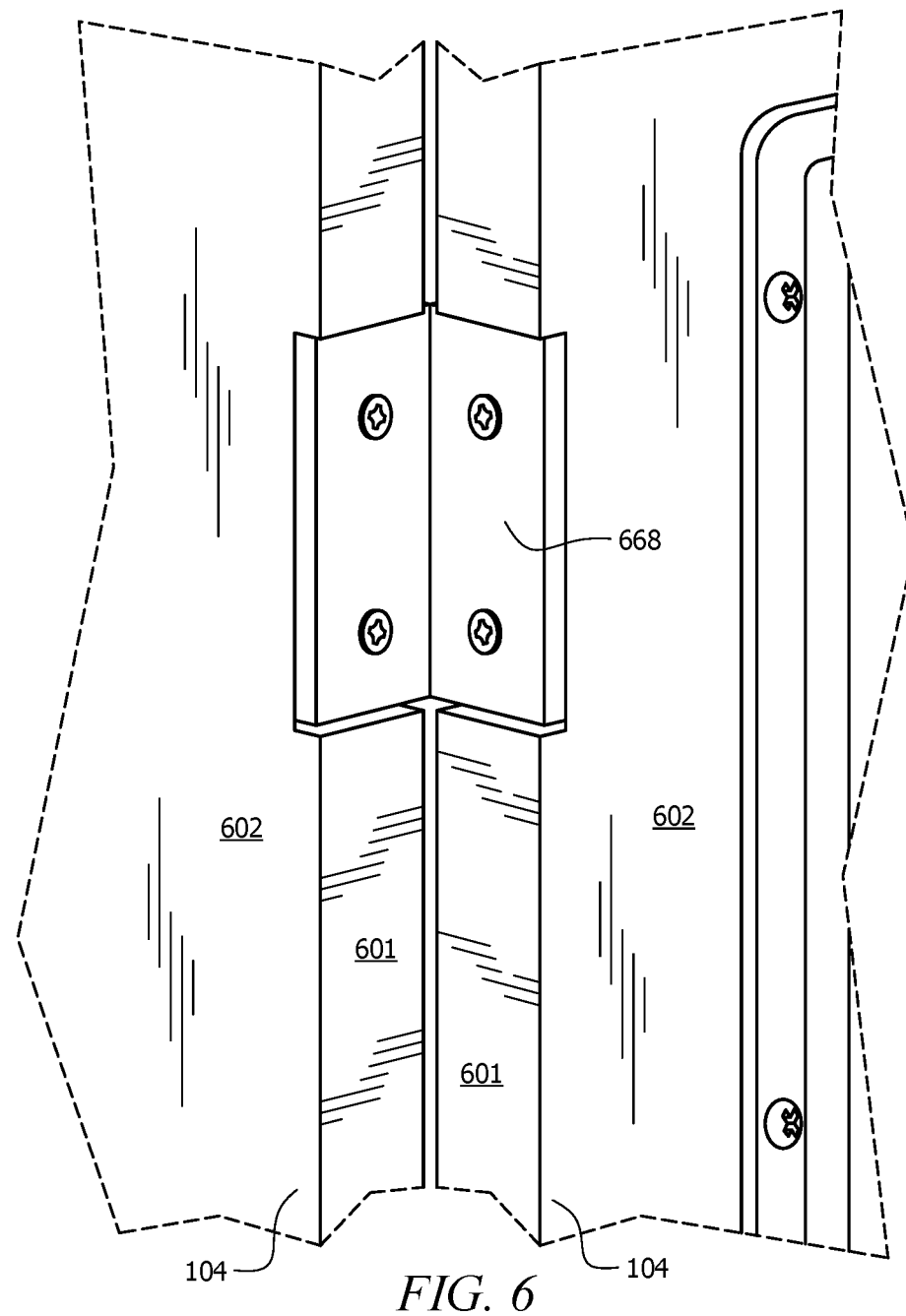
FIG. 6 illustrates a detailed view of a first hinge, according to an embodiment of the disclosure.

FIG. 6 shows a detailed view of a first hinge 668, which may comprise a mid-wall hinge, which may be positioned between two panels 104 and attached to the edges 601 of each of the panels 104. When completely unfolded, in the second configuration, the first hinge 668 may allow the edges 601 of the panels 104 to contact, and it may allow the faces 602 of the panels 104 to be flush with one another (e.g., forming a continuous wall plane), creating a larger wall or surface comprising the two panels 104 (e.g., a side surface of the final structure or playhouse). In other words, when folded, in the first configuration, the panels 104 attached to the mid-wall hinge 668 may be parallel and stacked into parallel planes with their faces contacting, and when unfolded, in the second configuration, the panels 104 attached to the mid-wall hinge 668 may be parallel in a continuous plane with their edges contacting.

Figure 7:
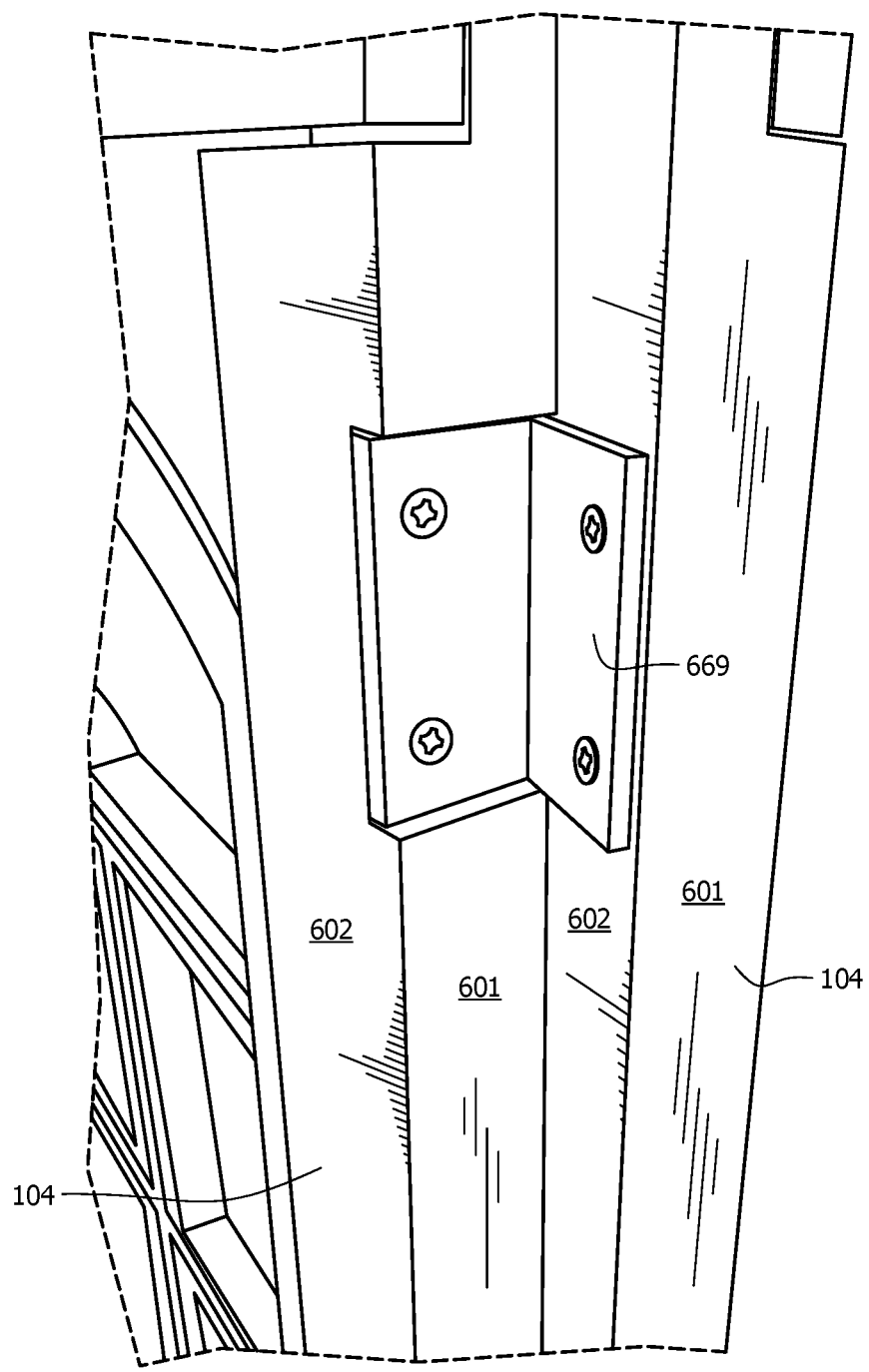
FIG. 7 illustrates a detailed view of a second hinge, according to an embodiment of the disclosure.

FIG. 7 shows a detailed view of a second hinge 669, which may comprise a corner hinge, which may be positioned between two panels 104. The second hinge 669 may be attached to the edge 601 of one panel 104 and attached to a face 602 of the other panel 104. When completely unfolded, the first hinge 668 may allow the edge 601 of one panel 104 to contact the face 602 of the other panel 104, creating a corner between the two panels 104. In other words, when folded, the panels 104 may be parallel with their faces contacting, and when unfolded, the panels 104 may be perpendicular with a face of one panel contacting the edge of the other panel.

Figure 8:
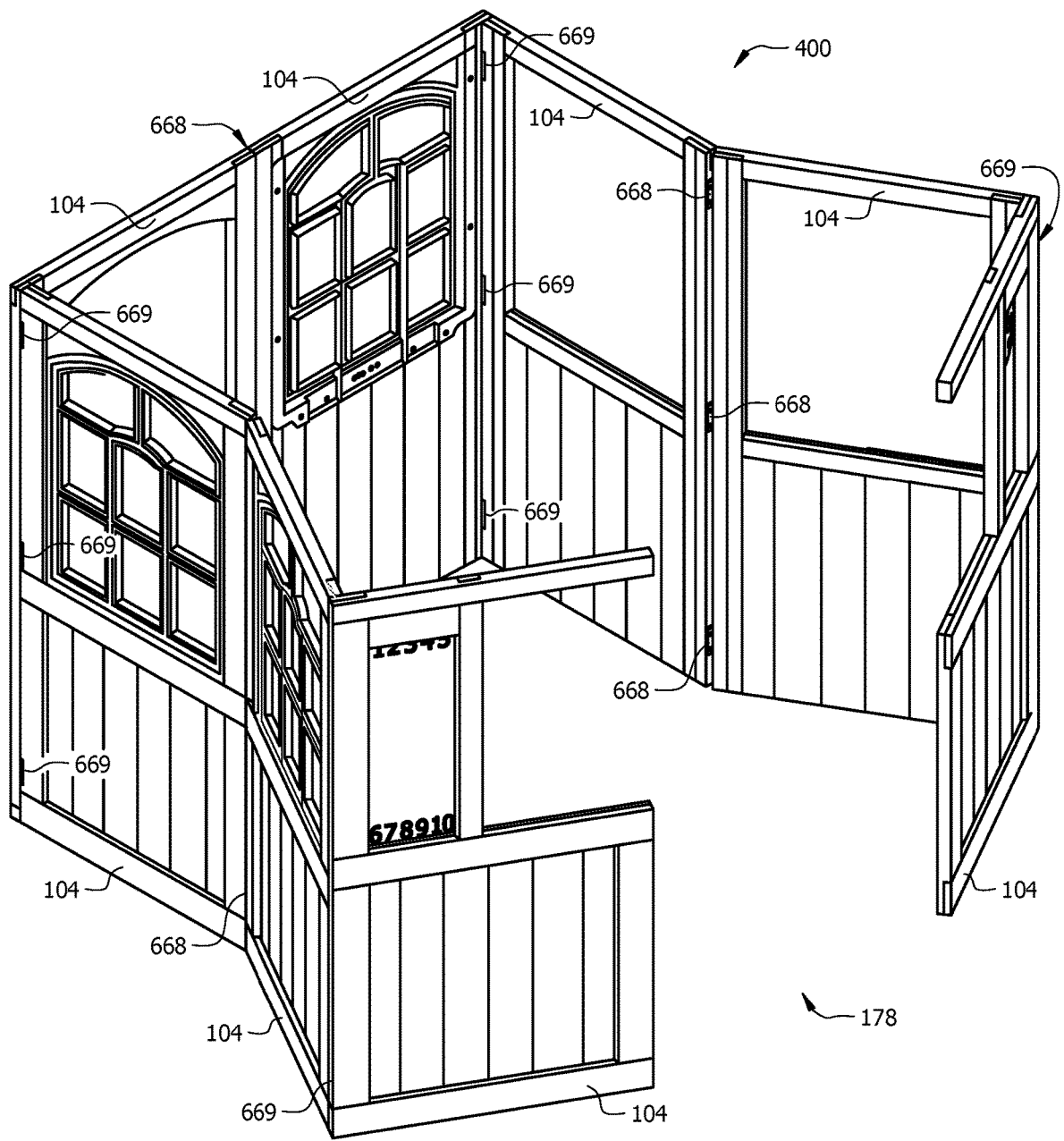
FIG. 8 illustrates a foldable playhouse with an accordion fold feature, according to an embodiment of the disclosure.

FIG. 8 illustrates another view of a partially unfolded accordion fold structure 400 (which may be similar to the partially unfolded accordion fold structure 400 shown in FIG. 4C), optionally using the mid-wall hinges 668 and the corner hinges 669 described above. In some embodiments, the accordion fold structure 400 comprises four corner hinges 669 and at least one mid-wall hinge 668 between each pair of corner hinges 669. In other words, between any two corner hinges 669 is at least one mid-wall hinge 668, and/or at least one mid-wall hinge 668 separates any two corner hinges 669.

Figure 4D:
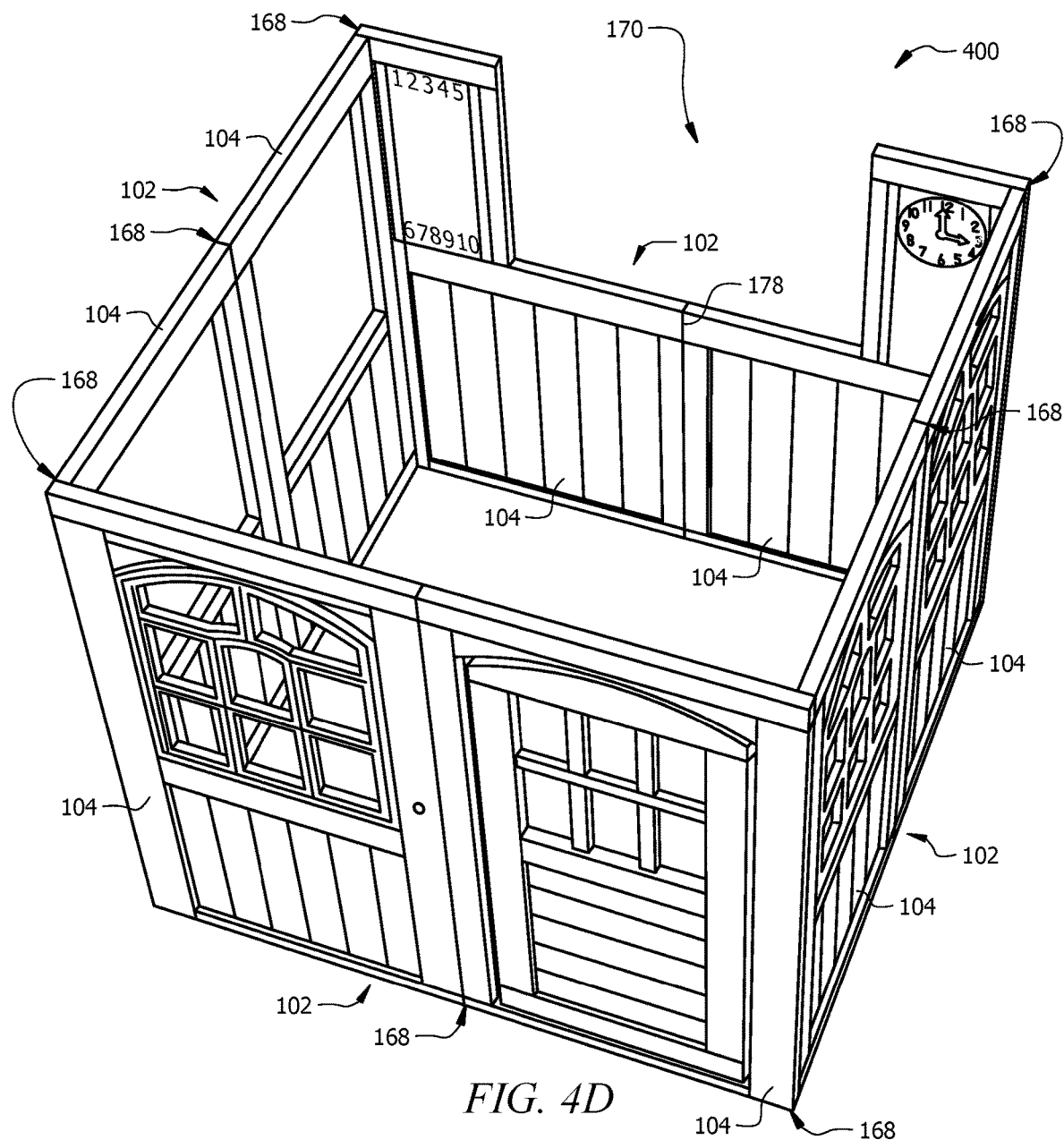
FIG. 4D illustrates a foldable playhouse with an accordion fold feature completely unfolded, according to an embodiment of the disclosure.
Figure 9:
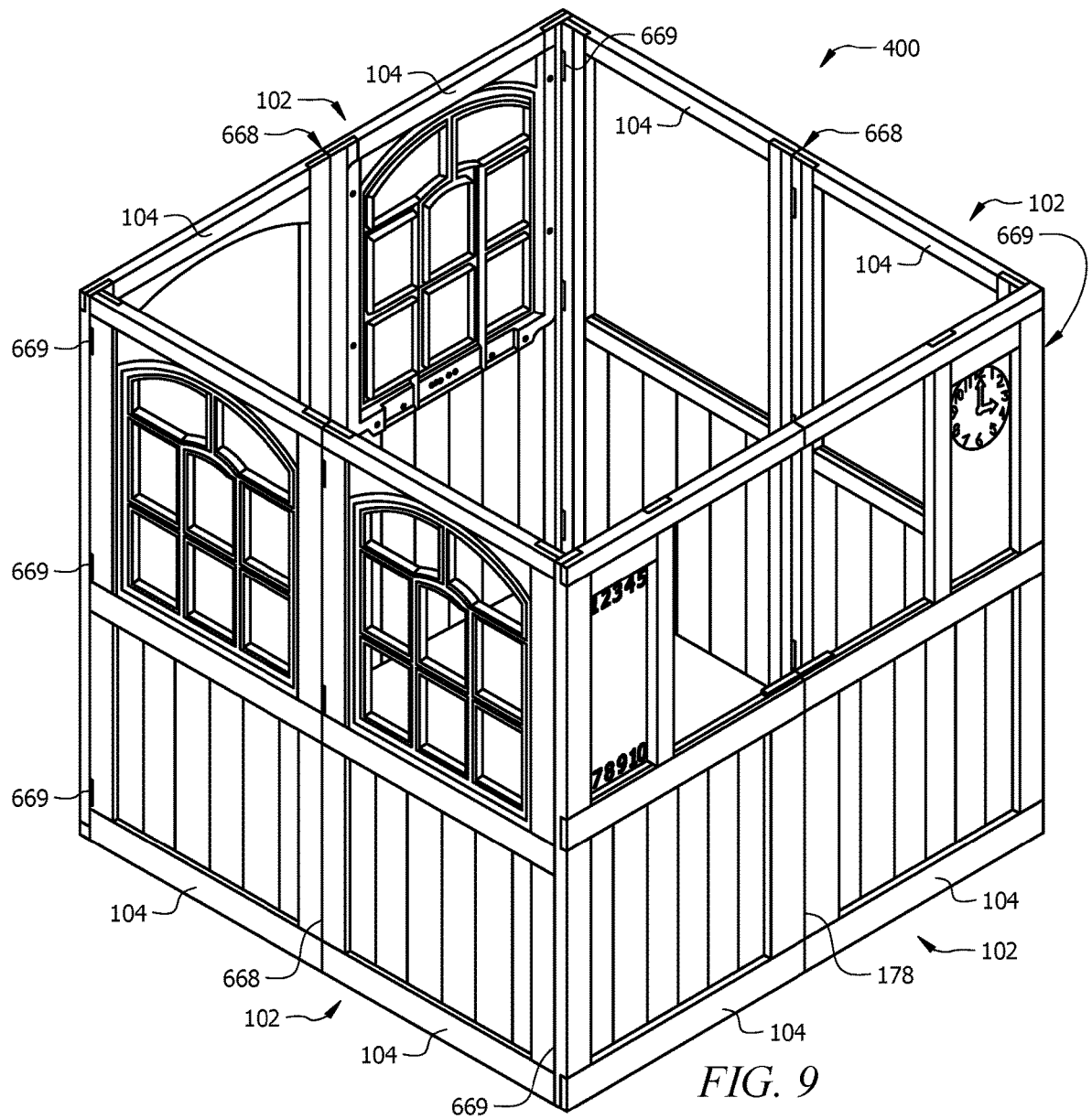
FIG. 9 illustrates a foldable playhouse with an accordion fold feature completely unfolded, according to an embodiment of the disclosure.

FIG. 9 illustrates another view of a fully unfolded accordion fold structure 400 (which may be similar to the accordion fold structure 400 shown in FIG. 4D), optionally using the mid-wall hinges 668 and the corner hinges 669 described above.

Figure 10:
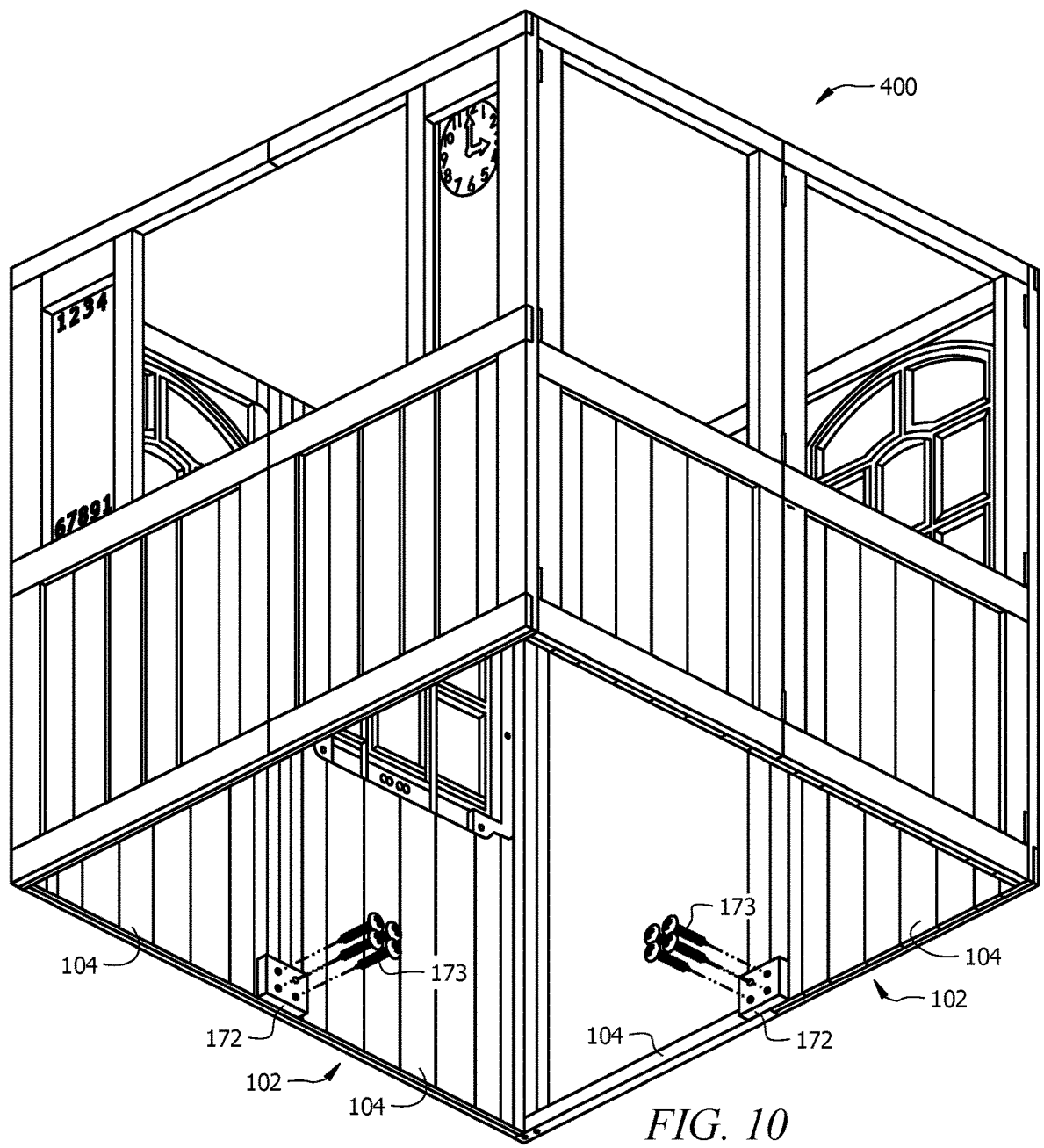
FIG. 10 illustrates an exemplary stabilizing feature of a foldable playhouse, according to an embodiment of the disclosure.

FIG. 10 illustrates an example of one or more braces 172 which may be used to support, fortify, secure, brace, and/or reinforce the junction between two panels 104 (e.g., forming a more solid wall spanning two panels) once the accordion fold structure 400 is completely unfolded. The braces 172 may comprise one or more blocks or panels, which may be attached to two panels 104 overlapping the junction or connection point of the two panels (e.g., in proximity to the mid-wall hinge joint), via one or more screws 173. In FIG. 10, the braces 172 are shown attached to a bottom edge of the panels 104, but the braces 172 may be attached at any point along the junction between the two panels 104 forming a joint wall.

Figure 11:
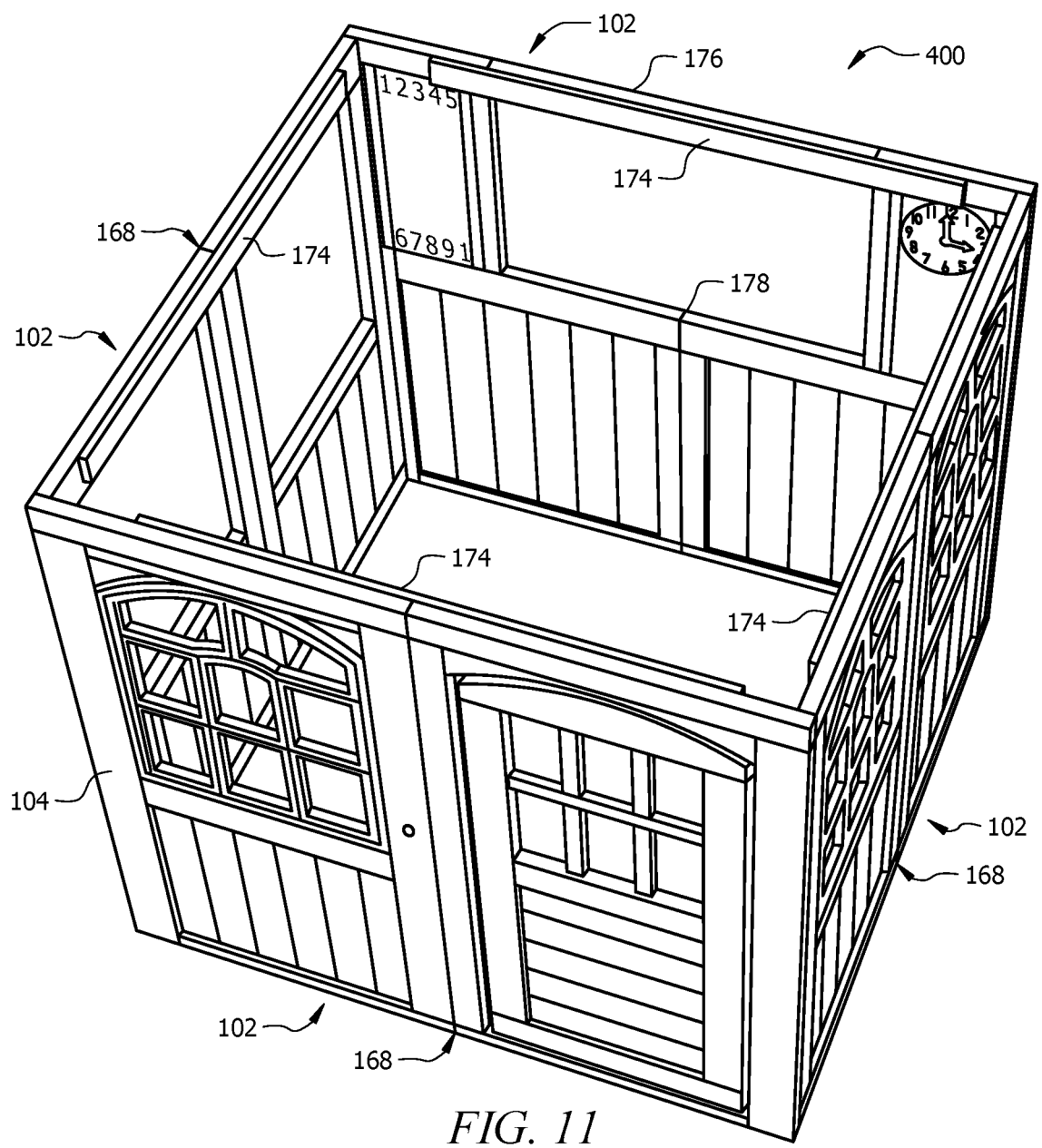
FIG. 11 illustrates exemplary locations for mounted lateral braces of a foldable playhouse, according to an embodiment of the disclosure.

Referring now to FIG. 11, some embodiments of the partially assembled accordion fold structure 400 may include lateral braces 174 in order to lock in place panels that have been "expanded" open. In a specific embodiment, these locks brace the panels from folding at the interior hinge locations, e.g., at hinge locations that do not form the corners of the partially assembled accordion fold structure 400. Lateral braces 174 may comprise one or a combination of plastic, or wood, or concrete, or the like. In some embodiments, lateral braces 174 may be mounted to the interior surface of the accordion fold structure 400 panels 104. Lateral braces 174 may be mounted to the top-most portion of the interior surface of panels 104. In other embodiments, lateral braces may be mounted to the bottom-most portion of the interior surface of panels 104. In still other embodiments, lateral braces 174 may be mounted to a portion of the interior surface of panels 104 that lies between the top-most portion and the bottom-most portion. Alternatively and/or additionally, lateral braces 174 may be mounted to the exterior surface of the accordion fold structure 400 panels 104. Lateral braces 174 may be mounted to the top-most portion of the exterior surface of panels 104. In other embodiments, lateral braces 174 may be mounted to the bottom-most portion of the exterior surface of panels 104. In still other embodiments, lateral braces 174 may be mounted to a portion of the exterior surface of panels 104 that lies between the top-most portion and the bottom-most portion.

Use of lateral braces 174 to stiffen hinges 168 may comprise the use of a single strip of lateral braces 174 or multiple strips of lateral braces 174, 176. As illustrated in FIG. 11, lateral braces may comprise the use of both interior lateral braces 174 and exterior lateral braces 176. In a specific embodiment, the use of multiple strips of lateral braces comprises a single strip of lateral braces 174 mounted to the top-most portion of each of four interior surfaces of panels 104 of a partially assembled accordion fold structure 400, and a single strip of exterior lateral braces 176 mounted to a top-most portion of an exterior surface of a panel 104 located at the rear of a accordion fold structure 400, e.g., at an opening gap 178, although more or fewer lateral braces 174 could be used. Although lateral braces are described above as reinforcing the non-corner hinge panel connections, corner braces could also be used in a similar manner, such as a right-angle corner brace that would help secure the corners of an assembled accordion fold structure 400.

Figure 12:
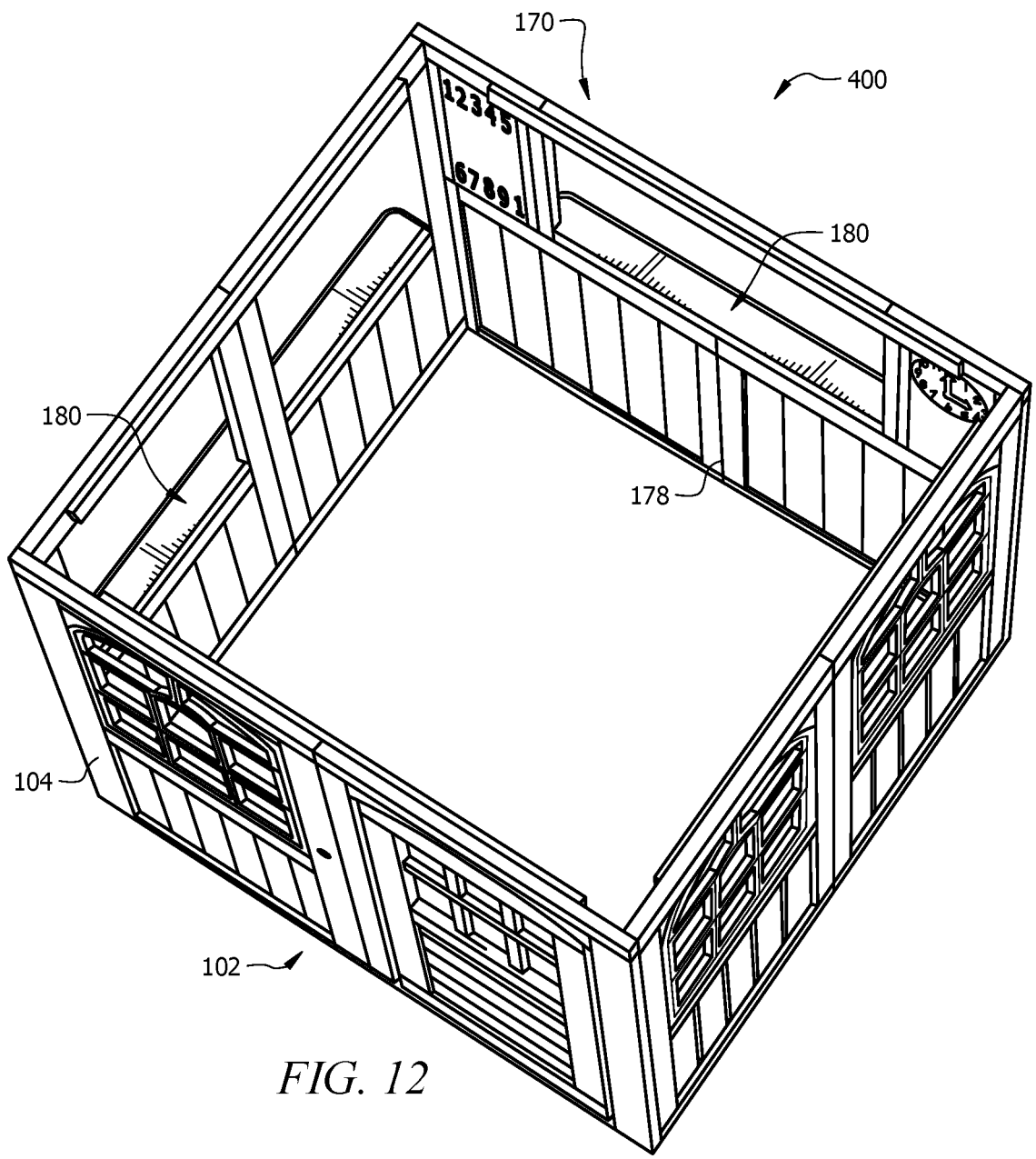
FIG. 12 illustrates exemplary locations for mounted shelves of a foldable playhouse, according to an embodiment of the disclosure.

FIG. 12 illustrates a specific embodiment of a partially assembled accordion fold structure 400 comprising panels 104 with a shelf 180 feature. A shelf 180 may be functional, or decorative, or both functional and decorative. A shelf 180 may comprise plastic, or wood, or concrete, or the like. The shelf 180 or another ornamental feature can be designed to further act as a lateral brace to be used as described with the lateral braces 176 (e.g., an opposite side of other brace for that wall or as the sole brace for a wall. Thus, a shelf 180 may be mounted on the exterior surface of a panel 104. Alternatively and/or additionally, a shelf 180 may be mounted on an interior surface of a panel 104. In a specific embodiment, a shelf 180 may be mounted to an exterior surface of a panel 104 located at the rear of a playhouse, e.g., at an opening 170 and/or used as a stiffening element for an opening gap 178.

An accordion fold structure 400 may alternatively and/or additionally comprise one or more shelves 180. In an embodiment, illustrated in FIG. 12, the accordion fold structure 400 may comprise two shelves 180 wherein a first shelf 180 may be mounted to an exterior surface of a panel 104 not located at the rear of a accordion fold structure 400, and a second shelf 180 may be mounted to an exterior surface of a panel 104 located at the accordion fold structure 400. While a specific embodiment of the accordion fold structure 400 comprises two shelves 180, it is contemplated that any number of shelves 180 may be mounted on the accordion fold structure 400, and that any number of them might be usable to brace the various walls and/or corners across the hinged wall or hinged corner connections. For example, a corner shelf 180 might be used to brace a corner hinged connection and a wall shelf 180 might be used to brace a wall hinged connection.

Figure 13A:
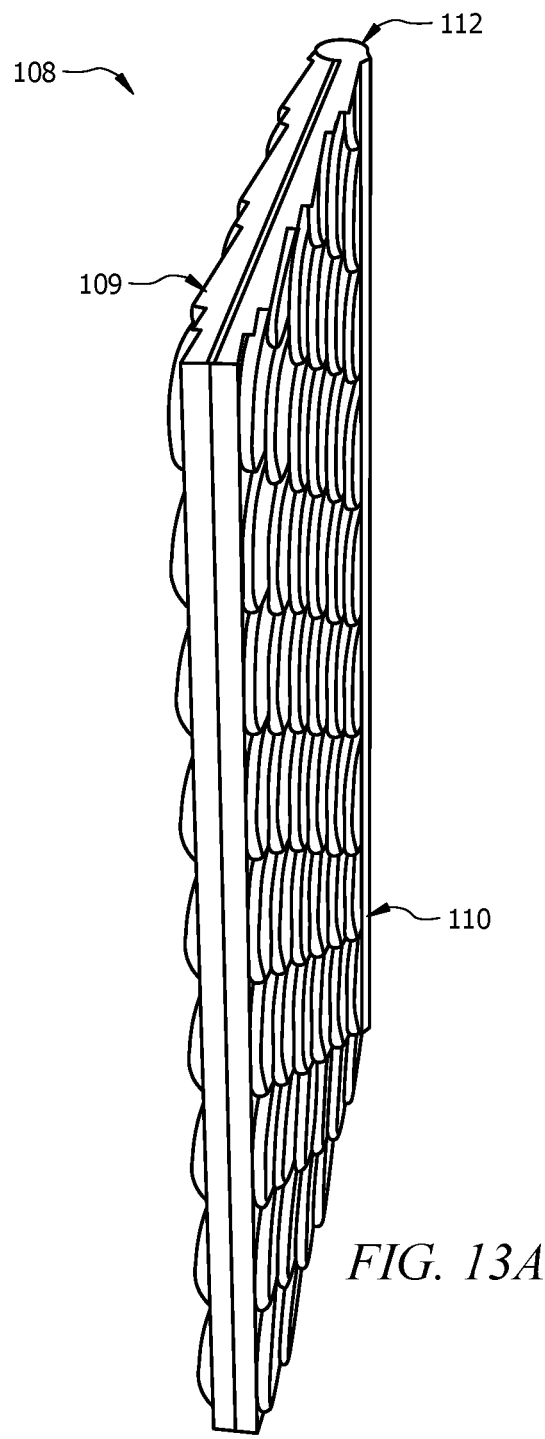
FIGS. 13A-13B illustrate a roof in a fully folded configuration, according to an embodiment of the disclosure.
Figure 13B:
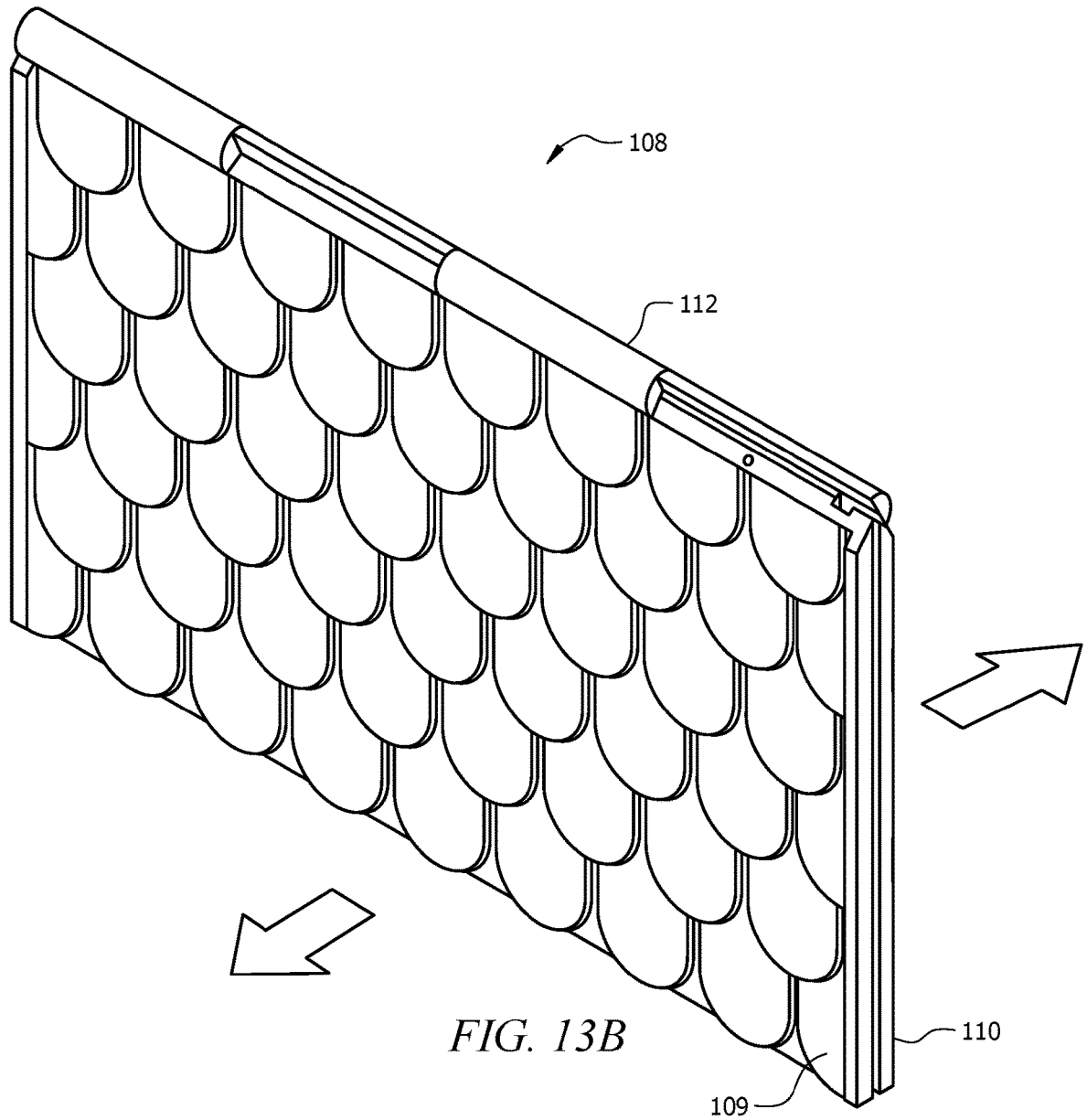

Referring now to FIGS. 13A-13B, a folded roof 108 may comprise a one or more roof panels 109 and 110 and roof hinges 112 (which join/connect the roof panels to allow for pivoting). Roof panels 109 and 110 may comprise a material such as plastic, or wood, or the like. In some embodiments, roof panels 109 and 110 may be injection-molded, blow-molded, or made by another like method that is readily known to one who is skilled in the art. As illustrated in FIGS. 13A-13B, a folded roof 108 may be flat, a feature that may minimize space needed for storage and/or shipping.

In some embodiments, roof panels 109 and 110 may be connected by one or more roof hinges 112. The number of hinges 112 may vary between different embodiments, and may be one, or two, or three, or four, or more than four hinges 168. Additionally, type of hinge may vary between different embodiments. A hinge 112 may be a flush hinge, a knuckle hinge, a butt hinge, a T-hinge, a strap hinge, a gate hinge, a double-acting hinge, a Soss hinge, a continuous hinge, a lift-joint butt hinge, an ornamental hinge, or any other type and/or style of hinge as would be readily known to one who is skilled in the art. In a specific embodiment, a roof 108 may comprise two roof panels 109 and 110 and roof hinges 112 which may be natural hinges comprising the same material as roof panels 109 and 110. In another embodiment, a roof 108 may comprise two roof panels 109 and 110 and roof hinges 112 which may be barrel and pin hinges.

Figure 14:
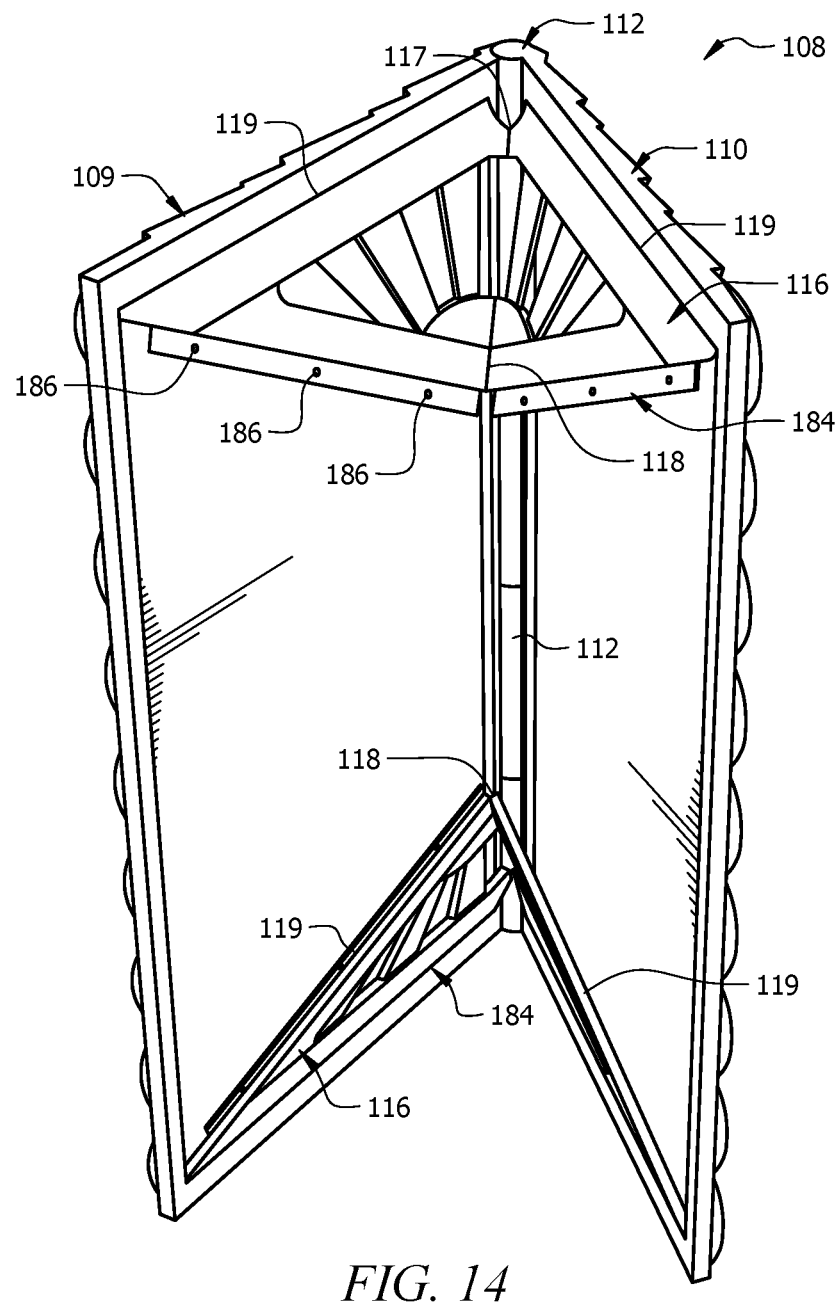
FIG. 14 illustrates a partially unfolded roof, according to an embodiment of the disclosure.
Figure 15A:
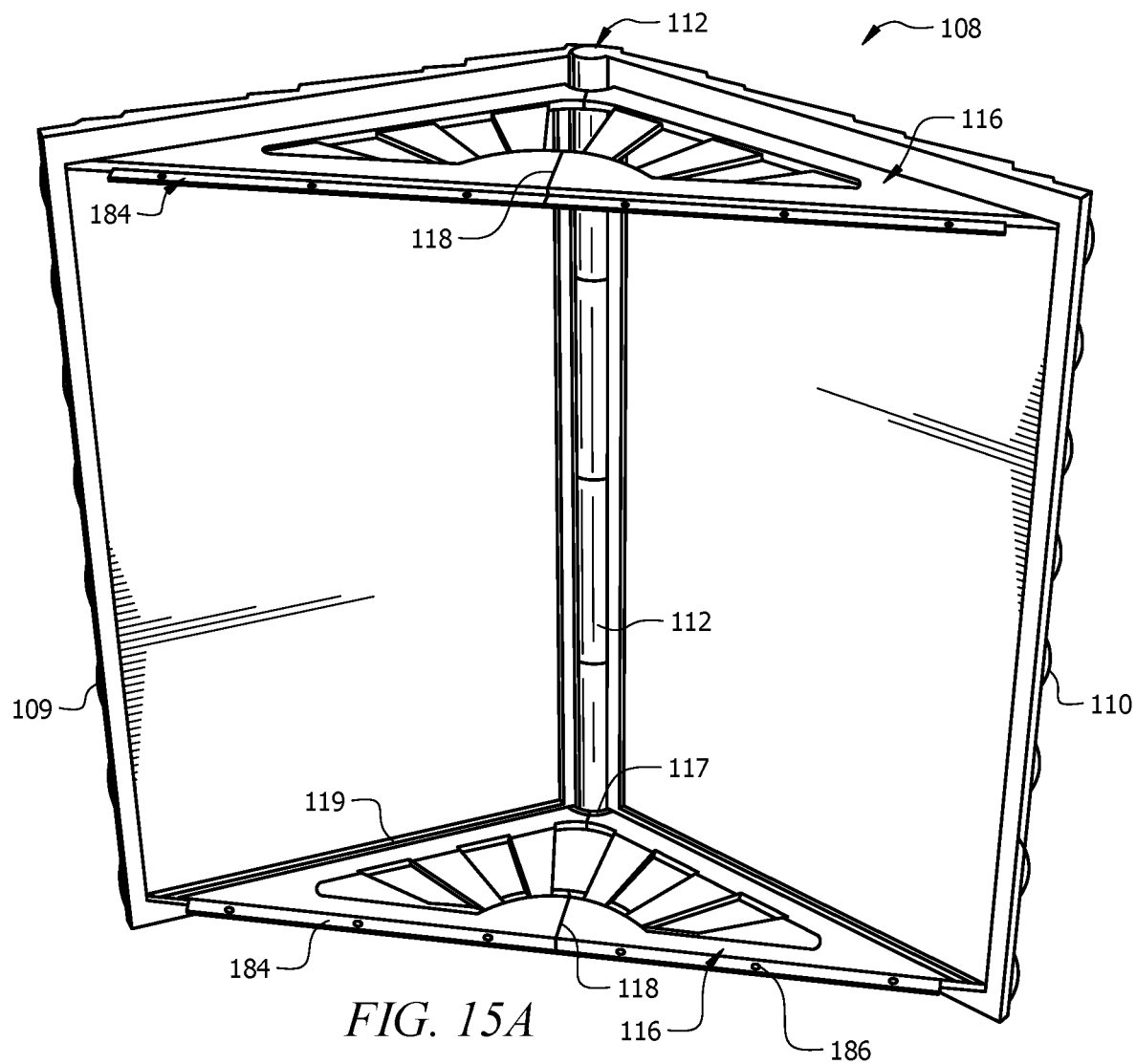
FIGS. 15A-B illustrate a roof in a fully unfolded configuration, with gables also fully unfolded, according to an embodiment of the disclosure.
Figure 15B:
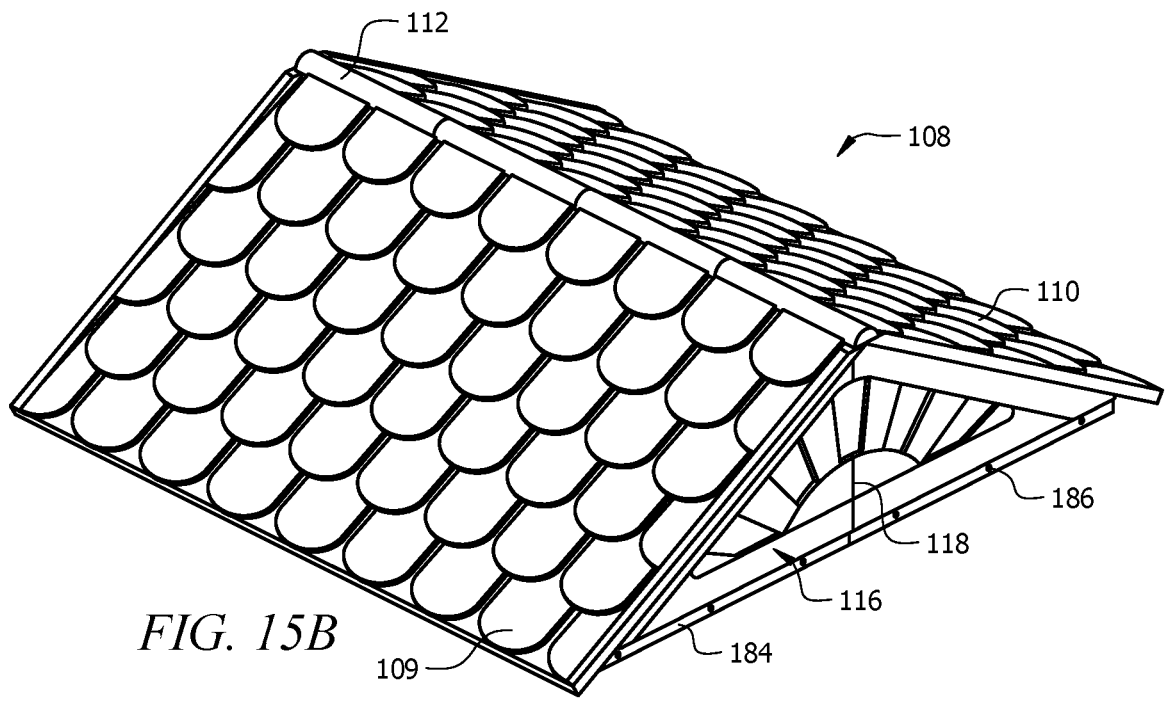

An unfolded roof 108 is illustrated in FIGS. 14 and 15A-15B at an about 33% unfolded configuration and a fully unfolded configuration, respectively. The roof 108 may comprise roof panels 109 and 110, roof hinge 112, gable 116, and/or flange 184.

The roof 108 may comprise one or more gables 116, which may comprise injection-molded plastic, or blow-molded plastic, or a wood frame, or the like. Additionally, gables 116 may comprise hinges 118 and 119 which may be attached to the roof 108. In a specific embodiment, illustrated in FIG. 14, 15A-15B, a gable 116 may comprise living hinges 119 which may be attached to roof panels 109 and 110 which may comprise roof hinges 112 across the top of the roof 108, i.e., at a surface where roof panels 109 and 110 meet. Additionally, the gable 116 may comprise living hinges 118 along an approximately center line of the gable 116, allowing the gable 116 to fold in half when the roof panels 109 and 110 are folded toward one another. The hinges 118 and 119 together allow the gable 116 to collapse inward as the roof is folded, so that in this embodiment, the gables are stored? within the roof panels (e.g., sandwiched) when the roof is folded.

As illustrated in FIG. 14, gables 116 may be connected to roof panels 109 and 110 and may therefore be operable to expand as roof panels 109 and 110 are unfolded, altogether simplifying the assembly process. As shown in FIG. 14, the roof panels 109 and 110 expand from a position where the gables 116 are folded inwardly (via hinges 118) under the panels such that the entire roof assembly is a flat assembly of about half the surface area of the expanded roof (the flat assembly shown in FIGS. 13A-13B), whereby the assembly can be shipped very easily. As the two roof panels 109 and 110 are pulled apart, the inwardly folded gables 116 expand and unfold outwardly, such, that as illustrated in FIGS. 15A-15B, when a roof 108 is fully expanded, gables 116 may be fully expanded as well. A roof 108 may additionally comprise one or more flanges 184, which may comprise injection molded plastic, or wood, or the like. The flanges 184 may serve to secure the roof 108 to the top edges of the panels 104 (optionally via one or more screw holes 186), and thus in the mounting of the roof 108 as a part of an assembled playhouse, the roof 108 also may serve as a lateral brace across the walls and corners strengthening the hinged connections of the playhouse in some embodiments (so other braces may not be needed).

Figure 16:
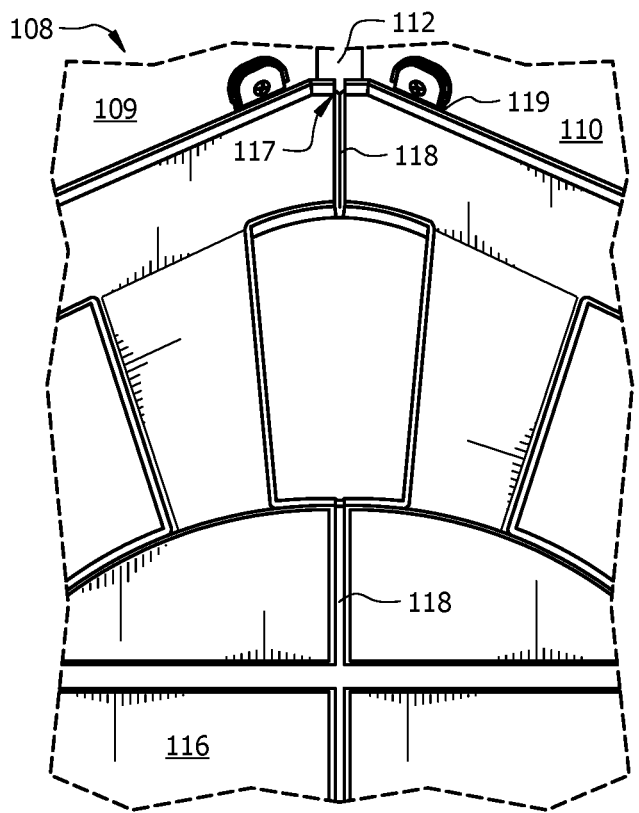
FIG. 16 illustrates a detailed view of a gable of a foldable roof, according to an embodiment of the disclosure.

FIG. 16 illustrates a detailed view of the gable 116 of the roof 108. The gable 116 may attach to the roof panels 109 and 110 via one or more hinges 119. The gable 116 may be configured to fold approximately in half via a hinge 118 positioned approximately along the center line of the gable 116. In some embodiments, the gable 116 may comprise one or more cut-outs 117 configured to allow the gable 116 to fold and fit around the one or more roof hinge 112.

Figure 17:
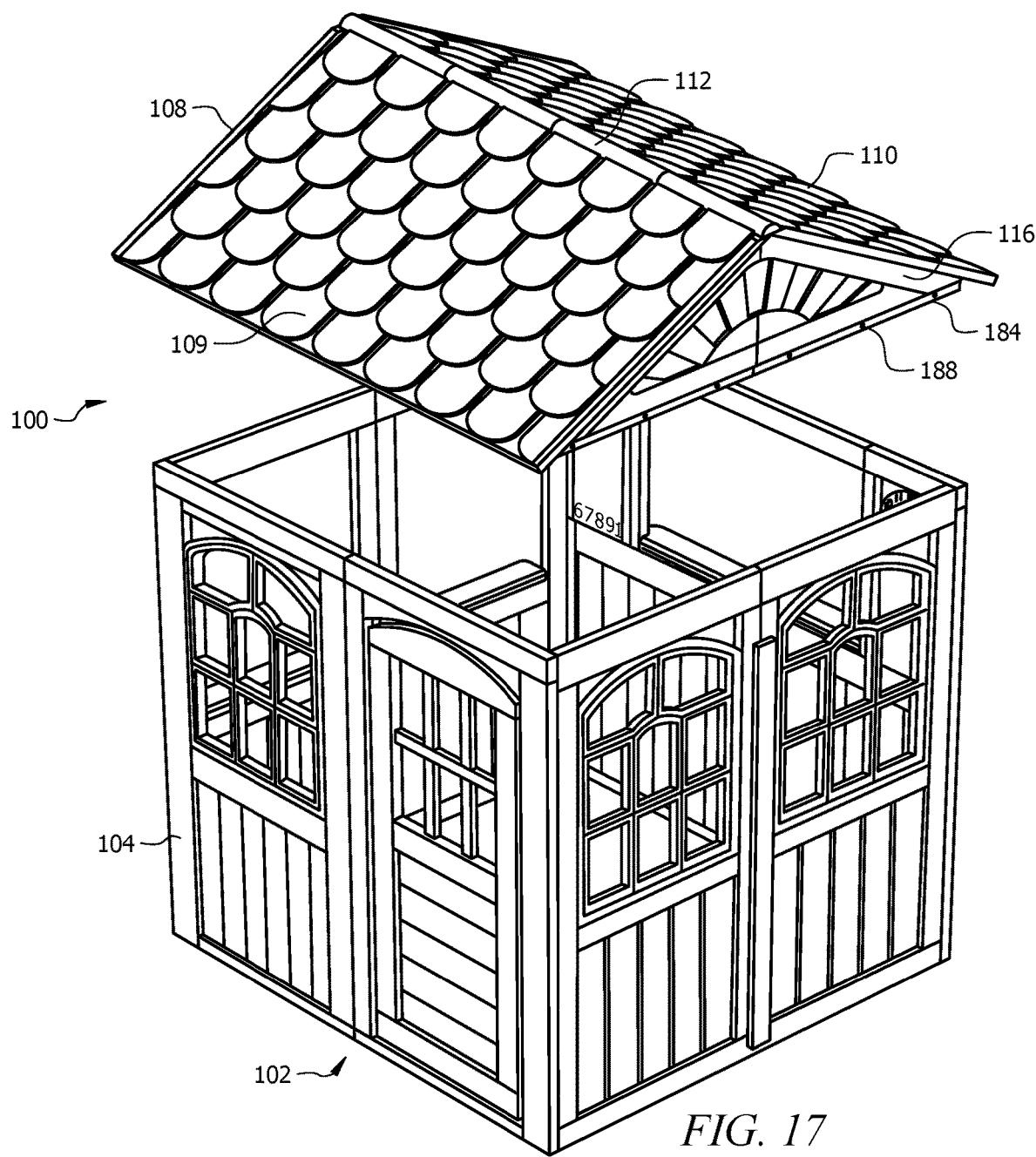
FIG. 17 illustrates assembling a foldable playhouse, according to an embodiment of the disclosure.

According to a specific embodiment, a foldable playhouse 100 may be assembled as illustrated in FIG. 17. In the described embodiment, a foldable playhouse 100 may comprise a roof 108, fully unfolded at roof hinge 112, fully expanded gables 116, and flanges 184 which may be operable to fit on the inside of panels 104. According to this embodiment, a roof 108 may be mounted onto panels 104 using screws 188, which may be placed such that they go through flanges 184 and pockets of panels 104. Additionally, screws 188 may be operable to tap into a thick substrate and may be self-tapping. In a specific embodiment, screws 188 may be self-tapping, comprised of plastic, and may be operable to tap into a substrate comprising wood.

In some embodiments, screws 188 may comprise plastic, steel, aluminum, copper, beryllium, titanium, or any combination of these materials. Alternatively and/or additionally, screws 188 may comprise any material that is readily known by one who is skilled in the art.

Embodiments of the disclosure may comprise a method of assembling a playhouse. The method may comprise providing a playhouse with an accordion fold structure comprising a plurality of panels each connected to another by at least one hinge (for example, in accordance with any of the embodiments described above), wherein in a first configuration of the accordion fold structure, the plurality of panels are folded to be stacked in substantially parallel planes, and in a second configuration of the accordion fold structure, the plurality of panels are unfolded forming a play structure. The method may comprise orienting the playhouse so that a bottom edge of each panel is located on the ground, and unfolding the playhouse from the first configuration to the second configuration.

In some embodiments, unfolding the playhouse may comprise rotating a first panel about a corner hinge relative to a second panel, forming a corner of the accordion fold structure comprising the first panel and the second panel, rotating a third panel about a mid-wall hinge relative to the second panel, and forming a continuous wall (e.g. plane) of the accordion fold structure comprising the second panel and the third panel. In some embodiments, the method may further comprise providing a gabled roof comprising at least two roof panels connected along a roof hinge, and at least one gable located between the two roof panels and connected to both of the two roof panels, wherein in the first configuration the roof panels and gable(s) are folded toward one another, unfolding the gable roof into the second configuration, and attaching the gabled roof to the top of the plurality of panels of the accordion fold structure. In some embodiments, the method may further comprise removing the accordion fold structure from a box while the accordion fold structure is in the first configuration, wherein the box is sized for shipping and transport (e.g., as described above).

Embodiments of the disclosure may also comprise a method of manufacturing a playhouse. A method may comprise providing a plurality of panels, wherein two panels are end panels and wherein the remainder of the panels are interior (or not-end) panels. The method may comprise attaching the panels to form an accordion fold structure comprising hinges (as described above). In some embodiments, the method may comprise folding the plurality of panels and hinges into a first configuration. In some embodiments, the method may comprise packaging the accordion fold structure within a box (e.g., as described above).

In some embodiments, the method may comprise providing at least two roof panels and at least one folding gable (e.g., as described above), attaching the roof panels to each other with a hinge, and attaching the folding gable to the two roof panels via hinges to form a gabled roof. In some embodiments, the method may comprise folding the gabled roof into a first, folded configuration. In some embodiments, the method may comprise packaging the gabled roof with the accordion fold structure within a box (e.g., as described above).

Figure 18:
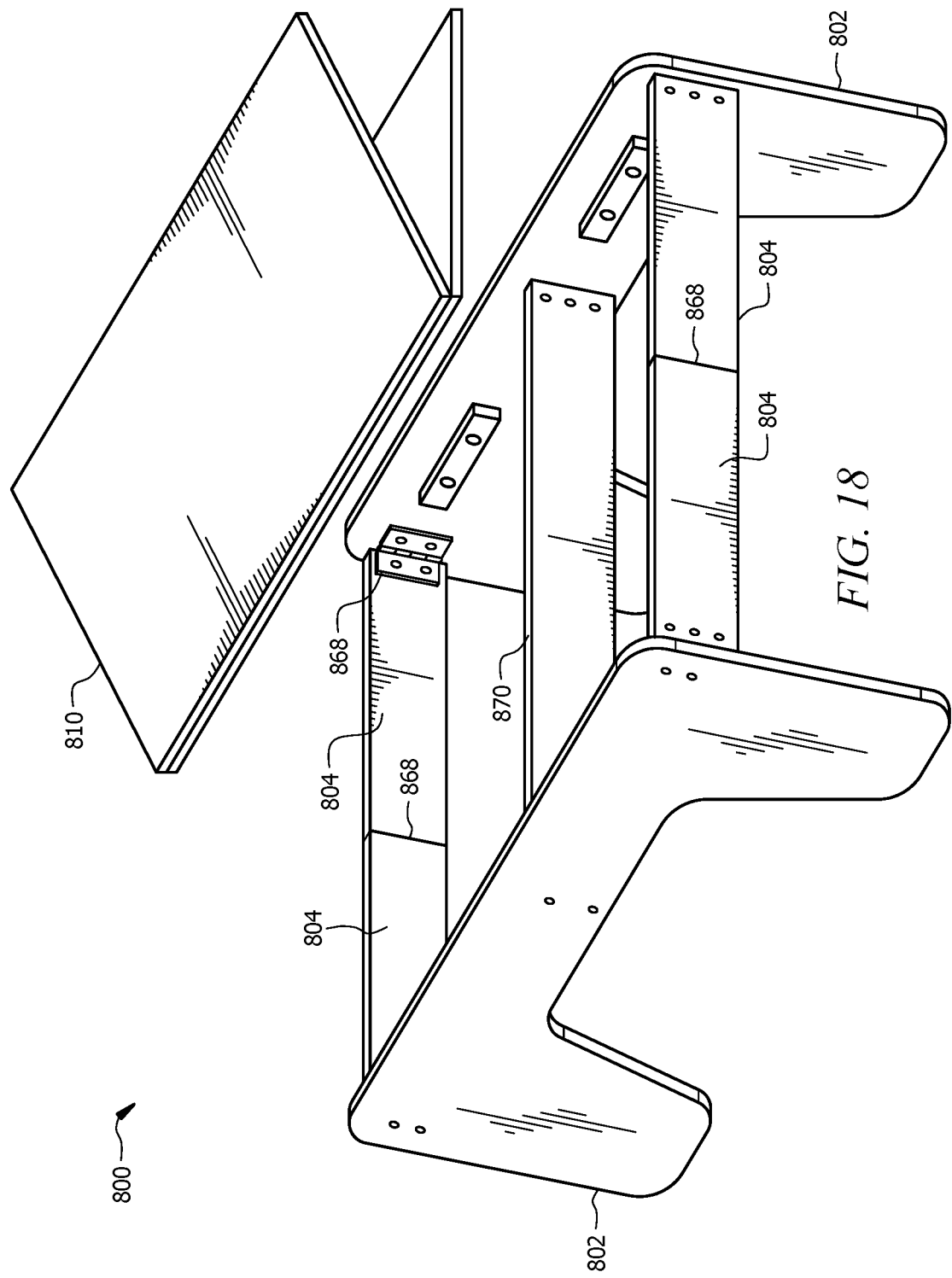
FIG. 18 illustrates a perspective, partially disassembled view of a foldable play table, according to an embodiment of the disclosure.

These sorts of foldable play structure are not limited to playhouses. For example, FIG. 18 illustrates another embodiment of an accordion fold structure that may form a play table 800. The play table 800 may comprise a plurality of panels 802 and 804 (which may comprise face panels 802 and side panels 804) forming a base, where in some embodiments, one or more of the panels 804 may comprise hinges 868 connecting the panels 804 to each other and to the panels 802, forming an accordion fold structure. In this embodiment, face walls 802 are each formed of a single panel, while side walls between the two face walls are formed of a plurality (typically tow) side panels 804. Then hinges 868 may function similarly to the hinges 168 described above. The panels 802 and 804 may function similarly to the panels 104 described above. For example, the accordion fold structure of the play table 800 may have a folded configuration (in which the side walls collapse inward and are confined (e.g., sandwiched) within the face walls and the face walls are parallel and located in proximity to one another) and an unfolded configuration (e.g., forming a table base with extended side walls between the face walls). In some embodiments, the play table 800 may comprise additional braces 870 and a top surface 810, where the top surface 810 may be configured to fold (or may be two separate portions). The braces 870 may be used to support, fortify, secure, brace, and/or reinforce the position of the panels 802 and 804 once the accordion fold structure 800 is completely unfolded.

In the embodiment shown in FIG. 18, the hinges 868 may allow the panels 804 to fold toward one another (e.g., collapsing inwardly by pivoting panels, similar to the gable described above), allowing one face panel 802 to move toward the other face panel 802. In some embodiments, a brace 870 may be removed (or may not be present) when the play table 800 is folded, and then when the play table is unfolded, the brace 870 may be inserted to prevent the play table 800 from folding while in use. In some embodiments the hinges 868 may comprise mid-wall hinges and corner hinges (e.g., such as those described in FIGS. 6 and 7).

Figure 19:
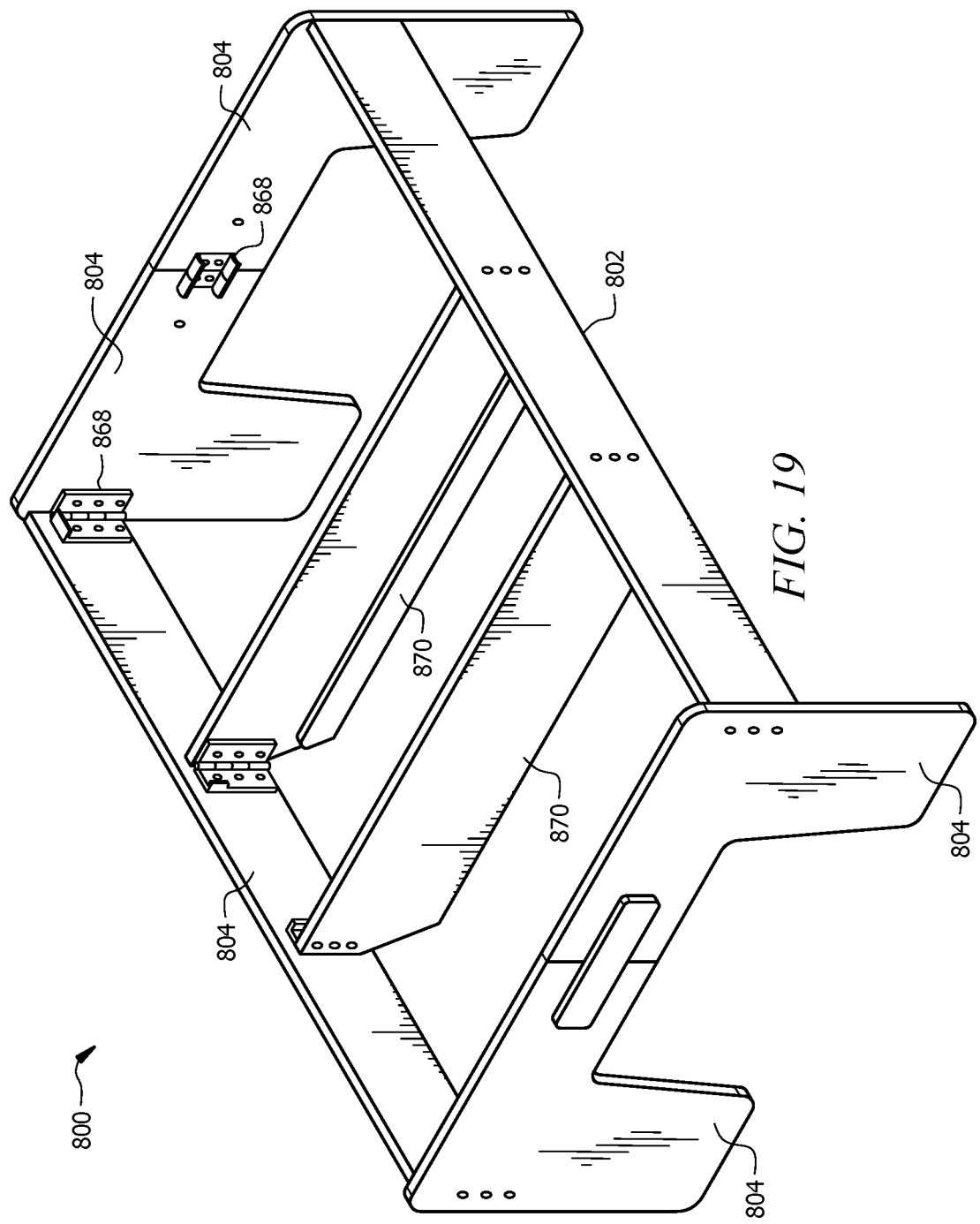
FIG. 19 illustrates a perspective, partially disassembled view of another foldable play table, according to an embodiment of the disclosure.

FIG. 19 illustrates another view of a play table 800 as described above, with the top surface 810 removed.

Figure 20:
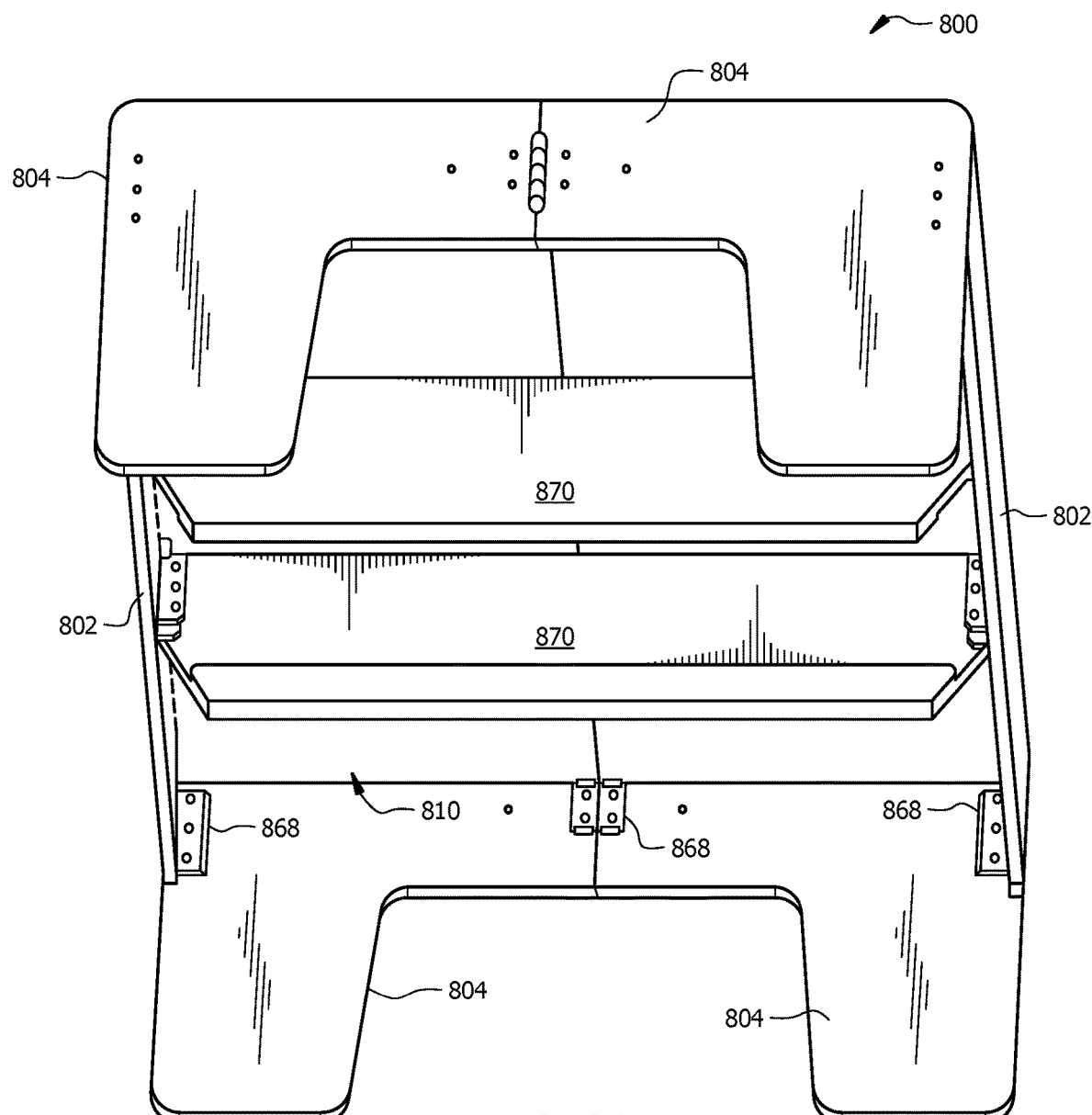
FIG. 20 illustrates a bottom view of a foldable play table, according to an embodiment of the disclosure.

FIG. 20 illustrates a bottom view of a play table 800 as described above, with the top surface 810 installed onto the panels 802 and 804.

While this invention has been described with reference to illustrative embodiments, this description is not intended to be construed in a limiting sense. A few preferred embodiments have been described in detail herein. It is to be understood that the scope of the invention also comprehends embodiments different from those described, yet within the scope of the claims. For example, as discussed above, the principles described herein could be used in structures or buildings having larger or smaller dimensions. Accessories may vary in type and material.

The material used for the elements could be plastic, or concrete, or wood, or the like. The plastic elements could be injection molded or blow molded. The plastic used in any of the elements could be one of various types of blow-molded thermoplastic materials such as Low Density Polyethylene (LDPE), Medium Density Polyethylene (MDPE), High Density Polyethylene (HDPE), Polyethylene Terephthalate (PET), Polypropylene (PP), or Polyvinyl Chloride (PVC). Additionally and/or alternatively, the elements could be formed using other types of plastics molding such as injection molding of Acrylonitrile Butadiene Styrene (ABS), Acrylonitrile Butadiene Styrene Polycarbonate (ABS/PC), High Density Polyethylene (HDPE), or other injection-molding-suitable plastics.

Further, other, non-thermoplastic materials such as wood or paper materials or concrete could be used for portions of the structure. Various other modifications and combinations of the illustrative embodiments, as well as other embodiments of the invention, will be apparent to persons skilled in the art upon reference to the description. It is therefore intended that subsequent claims encompass such modifications or embodiments.

Having described various devices and methods herein, exemplary embodiments or aspects can include, but are not limited to:

In a first embodiment, a foldable playhouse may comprise a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a playhouse.

A second embodiment can include the foldable playhouse of the first embodiment, wherein in the first configuration the hinges are exposed, and in the second configuration the hinges are positioned between the panels.

A third embodiment can include the foldable playhouse of the first or second embodiments, wherein the accordion fold structure comprises at least two corner hinges and at least one mid-wall hinge located between the at least two corner hinges.

A fourth embodiment can include the foldable playhouse of the third embodiment, wherein the accordion fold structure comprises four corner hinges, and wherein at least one mid-wall hinge separates any two corner hinges.

A fifth embodiment can include the foldable playhouse of the third or fourth embodiment, wherein the accordion fold structure comprises eight panels, wherein a first panel is connected to a second panel via a corner hinge, wherein the second panel is connected to a third panel via a mid-wall hinge, wherein the third panel is connected to a fourth panel via a corner hinge, wherein the fourth panel is connected to a fifth panel via a mid-wall hinge, wherein the fifth panel is connected to a sixth panel via a corner hinge, wherein the sixth panel is connected to a seventh panel via a mid-wall hinge, wherein the seventh panel is connected to an eighth panel via a corner hinge, and wherein the eighth panel is configured to contact the first panel when the playhouse is in the second configuration.

A sixth embodiment can include the foldable playhouse of any of the first through fifth embodiments, further comprising at least one mid-wall hinge attached to an edge of a first panel and an edge of a second panel, wherein in the first configuration the mid-wall hinge allows the panels to be stacked and contacting at the faces of the panels, and in the second configuration the mid-wall hinge allows the panels to be parallel and contacting at the edges of the panels, forming a continuous plane.

A seventh embodiment can include the foldable playhouse of the sixth embodiment, further comprising at least one corner hinge attached to an edge of a third panel and a face of a fourth panel, wherein in the first configuration the corner hinge allows the panels to be stacked and contacted at the faces of the panels, and in the second configuration the corner hinge allows the panels to be orthogonal forming a corner of the foldable playhouse.

An eighth embodiment can include the foldable playhouse of any of the first through seventh embodiments, wherein the plurality of panels comprises at least two end panels and at least one interior panel between the two end panels, and wherein each end panel is connected to only one of the plurality of panels and each interior panel is attached to two of the plurality of panels.

A ninth embodiment can include the foldable playhouse of any of the first through eighth embodiments, further comprising a gable roof comprising at least two roof panels connected along a roof hinge, and at least one gable located between the two roof panels and connected to both of the two roof panels, wherein the gabled roof is configured to attach to the plurality of panels at the top of the panels.

A tenth embodiment can include the foldable playhouse of the ninth embodiment, wherein the at least one gable comprises a hinge along a center line of the gable, wherein in the first configuration the gable is configured to fold along the hinge when the two roof panels are folded toward one another, and in the second configuration the gable is configured to unfold.

In an eleventh embodiment, a foldable play structure may comprise a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a play structure.

A twelfth embodiment can include the foldable play structure of the eleventh embodiment, wherein the play structure comprises a play table.

A thirteenth embodiment can include the foldable play structure of the twelfth embodiment, wherein the accordion fold structure comprises two face panels, four side panels, four corner hinges, and at least two mid-wall hinges.

A fourteenth embodiment can include the foldable play structure of any of the twelfth through thirteenth embodiments, wherein one mid-wall hinge connects a first side panel and a second side panel.

A fifteenth embodiment can include the foldable play structure of any of the twelfth through fourteenth embodiments, wherein one corner hinge connect each side panel to a face panel.

A sixteenth embodiment can include the foldable play structure of any of the twelfth through fifteenth embodiments, wherein the plurality of panels comprises six panels, wherein the six panels are connected using the mid-wall hinges and the corner hinges.

A seventeenth embodiment can include the foldable play structure of any of the eleventh through sixteenth embodiments, wherein the play structure comprises a play house.

An eighteenth embodiment can include the foldable play structure of the seventeenth embodiment, wherein the plurality of panels comprises eight panels, wherein the eight panels are connected by alternating the mid-wall hinges and the corner hinges.

In a nineteenth embodiment, a method for assembling a foldable playhouse may comprise providing a playhouse with an accordion fold structure comprising a plurality of panels each connected to another by at least one hinge, wherein in a first configuration of the accordion fold structure, the plurality of panels are folded to be stacked in substantially parallel planes, and in a second configuration of the accordion fold structure, the plurality of panels are unfolded forming a playhouse, wherein the provided playhouse is in the first configuration; orienting the playhouse so that a bottom edge of each panel is located on the ground; and unfolding the playhouse from the first configuration to the second configuration.

A twentieth embodiment can include the method of the nineteenth embodiment, wherein unfolding the playhouse comprises rotating a first panel about a corner hinge relative to a second panel; forming a corner of the accordion fold structure comprising the first panel and the second panel; rotating a third panel about a mid-wall hinge relative to the second panel; and forming a continuous side plane of the accordion fold structure comprising the second panel and the third panel.

A twenty-first embodiment can include the method of the nineteenth or twentieth embodiment, further comprising providing a gabled roof comprising at least two roof panels connected along a roof hinge, and at least one gable located between the two roof panels and connected to both of the two roof panels, wherein in the first configuration the roof panels and gable(s) are folded toward one another; unfolding the gable roof into the second configuration; and attaching the gabled roof to the top of the plurality of panels of the accordion fold structure.

A twenty-second embodiment can include the method of any of the nineteenth through twenty-first embodiments, further comprising removing the accordion fold structure from a box while the accordion fold structure is in the first configuration, wherein the box is sized for shipping and transport.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A foldable playhouse comprising:
    a plurality of panels each connected to another by at least one hinge to provide an accordion fold structure;
    one or more braces; and
    a gable roof comprising at least two roof panels connected along a roof hinge, and at least one gable located between the two roof panels and connected to both of the two roof panels, wherein the at least one gable comprises a hinge along a center line of the gable, and wherein the gable roof is configured to attach to the plurality of panels at the top of the panels,
    wherein:
    the accordion fold play structure comprises two configurations,
    in a first configuration, the plurality of panels are folded to be stacked in substantially parallel planes, the one or more braces are not attached to the plurality of panels, the gable roof is not attached to the plurality of panels, the two roof panels of the gable roof are folded toward one another, and the at least one gable is folded inwardly along the hinge and stored between the two roof panels, and
    in a second configuration, the plurality of panels are unfolded, at least one of the one or more braces is attached at a position overlapping a junction between two panels of the plurality of panels to keep the two panels from folding, and the gable roof is unfolded and attached to the plurality of panels, forming a playhouse.

2. The foldable playhouse of claim 1, wherein in the first configuration the hinges are exposed, and in the second configuration the hinges are positioned between the panels.

3. The foldable playhouse of claim 1, wherein the accordion fold structure comprises at least two corner hinges and at least one mid-wall hinge located between the at least two corner hinges.

4. The foldable playhouse of claim 3, wherein the accordion fold structure comprises four corner hinges, and wherein at least one mid-wall hinge separates any two corner hinges.

5. The foldable playhouse of claim 3, wherein the accordion fold structure comprises eight panels, wherein a first panel is connected to a second panel via a corner hinge, wherein the second panel is connected to a third panel via a mid-wall hinge, wherein the third panel is connected to a fourth panel via a corner hinge, wherein the fourth panel is connected to a fifth panel via a mid-wall hinge, wherein the fifth panel is connected to a sixth panel via a corner hinge, wherein the sixth panel is connected to a seventh panel via a mid-wall hinge, wherein the seventh panel is connected to an eighth panel via a corner hinge, and wherein the eighth panel is configured to contact the first panel when the playhouse is in the second configuration.

6. The foldable playhouse of claim 1, further comprising at least one mid-wall hinge attached to an edge of a first panel and an edge of a second panel, wherein in the first configuration the mid-wall hinge allows the panels to be stacked and contacting at the faces of the panels, and in the second configuration the mid-wall hinge allows the panels to be parallel and contacting at the edges of the panels, forming a continuous plane.

7. The foldable playhouse of claim 1, further comprising at least one corner hinge attached to an edge of a third panel and a face of a fourth panel, wherein in the first configuration the corner hinge allows the panels to be stacked and contacted at the faces of the panels, and in the second configuration the corner hinge allows the panels to be orthogonal forming a corner of the foldable playhouse.

8. The foldable playhouse of claim 1, wherein the plurality of panels comprises at least two end panels and at least one interior panel between the two end panels, and wherein each end panel is connected to only one of the plurality of panels and each interior panel is attached to two of the plurality of panels.

9. A foldable play structure comprising:
a plurality of panels each connected to another by at least one hinge to provide an accordion fold structure;
one or more braces; and
a gable roof comprising at least two roof panels connected along a roof hinge, and at least one gable located between the two roof panels and connected to both of the two roof panels, wherein the at least one gable comprises a hinge along a center line of the gable, and wherein the gable roof is configured to attach to the plurality of panels at the top of the panels,
wherein:
the accordion fold play structure comprises two configurations,
in a first configuration, the plurality of panels are folded to be stacked in substantially parallel planes, the one or more braces are not attached to the plurality of panels, the gable roof is not attached to the plurality of panels, the two roof panels of the gable roof are folded toward one another, and the at least one gable is folded inwardly along the hinge and stored between the two roof panels, and
in a second configuration, the plurality of panels are unfolded, at least one of the one or more braces is attached at a position overlapping a junction between two panels of the plurality of panels to keep the two panels from folding, and the gable roof is unfolded and attached to the plurality of panels, forming a play structure.

10. The foldable play structure of claim 9, wherein the play structure comprises a play table.

11. The foldable play structure of claim 10, wherein the accordion fold structure comprises two face panels, four side panels, four corner hinges, and at least two mid-wall hinges.

12. The foldable play structure of claim 10, wherein one mid-wall hinge connects a first side panel and a second side panel.

13. The foldable play structure of claim 10, wherein one corner hinge connect each side panel to a face panel.

14. The foldable play structure of claim 9, wherein the play structure comprises a play house.

15. A method for assembling a foldable playhouse, the method comprising:
providing a playhouse with an accordion fold structure comprising a plurality of panels each connected to another by at least one hinge and further comprising one or more braces and a gable roof, wherein the gable roof comprises at least two roof panels connected along a roof hinge, and at least one gable located between the two roof panels and connected to both of the two roof panels, wherein the at least one gable comprises a hinge along a center line of the gable, and wherein the gable roof is configured to attach to the plurality of panels at the top of the panels, wherein in a first configuration of the accordion fold structure, the plurality of panels are folded to be stacked in substantially parallel planes, the one or more braces are not attached to the plurality of panels, the gable roof is not attached to the plurality of panels, the two roof panels of the gable roof are folded toward one another, and the at least one gable is folded inwardly along the hinge and stored between the two roof panels, and in a second configuration of the accordion fold structure, the plurality of panels are unfolded, at least one of the one or more braces is attached at a position overlapping a junction between two panels of the plurality of panels to keep the two panels from folding, and the gable roof is unfolded and attached to the plurality of panels, forming a playhouse, wherein the provided playhouse is in the first configuration;
orienting the plurality of panels so that a bottom edge of each panel is located on the ground;
unfolding the plurality of panels from the first configuration to the second configuration;
attaching at least one of the one or more braces at a position overlapping a junction between two panels of the plurality of panels to keep the two panels from folding;
unfolding the gable roof from the first configuration to the second configuration; and
attaching the gable roof to the plurality of panels at the top of the panels.

16. The method of claim 15, wherein unfolding the playhouse plurality of panels comprises:
rotating a first panel about a corner hinge relative to a second panel;
forming a corner of the accordion fold structure comprising the first panel and the second panel;
rotating a third panel about a mid-wall hinge relative to the second panel; and
forming a continuous side plane of the accordion fold structure comprising the second panel and the third panel.

17. The method of claim 15, further comprising removing the accordion fold structure from a box while the accordion fold structure is in the first configuration, wherein the box is sized for shipping and transport.

* * * * *